(12) United States Patent
Tremblay et al.

(10) Patent No.: US 7,899,892 B2
(45) Date of Patent: Mar. 1, 2011

(54) MANAGEMENT OF EXTENSIBILITY SERVERS AND APPLICATIONS

(75) Inventors: Edward K. Tremblay, Bellevue, WA (US); Mai-lan Tomsen Bukovec, Seattle, WA (US); Eric B. Watson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 633 days.

(21) Appl. No.: 11/392,084

(22) Filed: Mar. 28, 2006

(65) Prior Publication Data

US 2007/0233831 A1   Oct. 4, 2007

(51) Int. Cl.
*G06F 15/177* (2006.01)
(52) U.S. Cl. .................. 709/221; 709/220; 709/223; 709/224; 709/225; 709/226; 717/168; 717/171; 717/172
(58) Field of Classification Search .................. 717/120, 717/121; 370/256; 709/229, 223, 203, 219, 709/220, 221, 224, 226
See application file for complete search history.

(56) References Cited

U.S. PATENT DOCUMENTS

| | | | |
|---|---|---|---|
| 4,007,444 A | 2/1977 | Anceau et al. | |
| 4,015,242 A | 3/1977 | Anceau et al. | |
| 5,312,478 A | 5/1994 | Reed et al. | |
| 5,539,659 A | 7/1996 | McKee et al. | |
| 5,627,766 A | 5/1997 | Beaven | |
| 5,819,028 A | 10/1998 | Manghirmalani et al. | |
| 6,061,722 A | 5/2000 | Lipa et al. | |
| 6,101,537 A | 8/2000 | Edelstein et al. | |
| 6,148,335 A | 11/2000 | Haggard et al. | |
| 6,389,589 B1 | 5/2002 | Mishra et al. | |
| 6,463,446 B1 | 10/2002 | Wollrath et al. | |
| 6,615,258 B1 * | 9/2003 | Barry et al. | 709/223 |
| 6,622,190 B1 | 9/2003 | Westerman et al. | |
| 6,732,181 B2 * | 5/2004 | Lim et al. | 709/229 |
| 6,754,470 B2 | 6/2004 | Hendrickson et al. | |
| 6,880,086 B2 | 4/2005 | Kidder et al. | |
| 6,885,641 B1 | 4/2005 | Chan et al. | |
| 6,895,444 B1 | 5/2005 | Weisshaar et al. | |
| 6,898,790 B1 | 5/2005 | Cheong et al. | |

(Continued)

FOREIGN PATENT DOCUMENTS

WO    WO2004085622    10/2004

OTHER PUBLICATIONS

Microsoft Corporation, "Windows Small Business Server 2003: Frequently Asked Questions," <http://www.microsoft.com/windowsserver2003/sbs/techinfo/overview/generalfaq.mspx>, 20 pages (accessed Jan. 30, 2006).

(Continued)

*Primary Examiner*—Dohm Chankong
(74) *Attorney, Agent, or Firm*—Klarquist Sparkman, LLP

(57) ABSTRACT

Extensibility computer servers and extensibility applications can be managed. Extensibility computer servers and extensibility applications can be discovered using a management application on a management computer server. An extensibility agent can be installed on an extensibility computer server, and used to provide status information. Tasks can be created for managing extensibility computer servers and extensibility applications. Entity groups representing extensibility computer servers and extensibility applications can be displayed and selected. Extensibility computer servers and extensibility applications can be displayed based on the selection of an entity group. Task templates associated with a selected entity group can be displayed.

11 Claims, 25 Drawing Sheets

U.S. PATENT DOCUMENTS

| | | | |
|---|---|---|---|
| 6,957,256 B1 * | 10/2005 | Bradley et al. | 709/223 |
| 6,961,586 B2 | 11/2005 | Barbosa et al. | |
| 6,998,978 B2 | 2/2006 | Kirkeby | |
| 7,047,498 B2 * | 5/2006 | Lui et al. | 715/762 |
| 7,082,464 B2 * | 7/2006 | Hasan et al. | 709/223 |
| 7,152,018 B2 * | 12/2006 | Wicks | 702/186 |
| 7,343,604 B2 | 3/2008 | Grabarnik et al. | |
| 7,359,961 B2 * | 4/2008 | Nagata | 709/223 |
| 7,421,694 B2 | 9/2008 | Gosalia et al. | |
| 7,430,535 B2 | 9/2008 | Dougherty et al. | |
| 7,441,022 B1 | 10/2008 | Schuba et al. | |
| 7,512,071 B2 | 3/2009 | Goldschmidt et al. | |
| 7,624,393 B2 * | 11/2009 | Egan et al. | 717/173 |
| 7,694,294 B2 * | 4/2010 | Bukovec et al. | 717/173 |
| 2002/0120480 A1 | 8/2002 | Kroeger | |
| 2003/0233483 A1 | 12/2003 | Melchione et al. | |
| 2004/0006586 A1 | 1/2004 | Melchione et al. | |
| 2004/0019889 A1 | 1/2004 | Melchione et al. | |
| 2004/0240385 A1 | 12/2004 | Boggs et al. | |
| 2005/0028158 A1 | 2/2005 | Ferguson et al. | |
| 2005/0044209 A1 * | 2/2005 | Doyle et al. | 709/224 |
| 2005/0064820 A1 | 3/2005 | Park et al. | |
| 2005/0071853 A1 | 3/2005 | Jones et al. | |
| 2005/0091411 A1 | 4/2005 | Michaiel et al. | |
| 2005/0125529 A1 | 6/2005 | Brockway et al. | |
| 2005/0257214 A1 | 11/2005 | Moshir et al. | |
| 2005/0267972 A1 | 12/2005 | Costa-Requena et al. | |
| 2005/0278440 A1 | 12/2005 | Scoggins | |
| 2005/0278445 A1 | 12/2005 | Quang et al. | |
| 2005/0278703 A1 | 12/2005 | Lo et al. | |
| 2006/0092861 A1 * | 5/2006 | Corday et al. | 370/256 |
| 2006/0129569 A1 | 6/2006 | Dieberger et al. | |
| 2006/0173900 A1 | 8/2006 | Dhayalan et al. | |
| 2006/0248193 A1 | 11/2006 | Elvanoglu et al. | |
| 2006/0282302 A1 | 12/2006 | Hussain | |
| 2007/0011303 A1 | 1/2007 | Hatakeyama et al. | |
| 2007/0143482 A1 | 6/2007 | Zancho | |
| 2007/0157192 A1 * | 7/2007 | Hoefler et al. | 717/168 |
| 2007/0179931 A1 | 8/2007 | Juby et al. | |
| 2007/0233831 A1 | 10/2007 | Tremblay et al. | |
| 2007/0266133 A1 | 11/2007 | Bukovec et al. | |
| 2008/0052384 A1 * | 2/2008 | Marl et al. | 709/223 |
| 2008/0270929 A1 | 10/2008 | Bohn et al. | |
| 2009/0019141 A1 * | 1/2009 | Bush et al. | 709/223 |
| 2009/0052440 A1 | 2/2009 | Pfeffer et al. | |

OTHER PUBLICATIONS

Microsoft Corporation, "Windows Small Business Server 2003 Big Breakthroughs for Small Businesses," <http://rad.microsoft.com/ADSAdClient31.dll?GetAd=&PG=CMSSB1&SC=F3&AP=1164>, 35 pages (accessed Jan. 30, 2006).

Hewlett-Packard Development Company, "Instructions for installing Microsoft Windows Small Business Server 2003 with Service Pack 1 on HP ProLiant and tc servers," <http://h20000.www2.hp.com/bc/docs/support/SupportManual/c00208458/c00208458.pdf >, 12 pages (accessed Jan. 30, 2006).

Kershenbaum, "MENTOR: An algorithm for mesh network topological optimization and routing," IEEE Transactions on Communications, <http://ieeexplore.ieee.org/xpl/abs_free.jsp?arNumber=81738>, 11 pages (1991).

Douligeris, "Computer networks design using hybrid fuzzy expert systems," <http://www.springerlink.com/(x54sdi55daajvizabanjdwbg)/app/home/contribution.asp?referrer=parent&backto=issue,3,7;journal,44,63;linkingpublicationresults,1:101181,1>, 2 pages (accessed Jan. 5, 2006).

Cisco Systems, "Enhancing Usage Analysis with Cisco Service Control," <http://www.cisco.com/en/US/products/ps6150/prod_brochure0900aecd8024195e.html>, 7 pages (accessed Jan. 5, 2006).

Lucent, "VitalSuite® Network Performance Management Software for Enterprises," <http://www.lucent.com/products/solution/0,,CTID+2020-STID+10439-SOID+1452-LOCL+1,00.html>, 4 pages (accessed Jan. 5, 2006).

Hamblen, "Update: Cisco unveils application network services. They're designed to improve the performance of software applications," <http://www.computerworld.com/networkingtopics/networking/lanwan/story/0,10801,106808,00.html?from=story_kc>, 3 pages (accessed Jan. 4, 2006).

Olsen, "User centric Service Discovery in Personal Networks," <http://www.ist-magnet.org/private/files/Dissemination/WP2/wpmc2004_Rasmus.pdf>, 5 pages (Sep. 2004).

Carey, "Large-Scale Corba-Distributed Software Framework for Nif Controls," <http://www.slac.stanford.edu/econf/C011127/THAI001.pd>, 5 pages (2001).

* cited by examiner

MANAGEMENT OF EXTENSIBILITY SERVERS AND APPLICATIONS

BACKGROUND

Despite advances in technology, efficiently managing computer servers and software can be difficult, especially where the servers and software are not designed to be managed together from a central location. For example, a customer may purchase a software package from a software manufacturer. The software package can include software for managing various applications of the software package. However, the customer may have additional software packages, some from other software manufacturers, that the customer needs to manage. In order to manage all of the software packages, applications, and servers that comprise the customer's computer network, the customer may have to use a number of different software tools on a number of different computer servers.

Therefore, there exists ample room for improvement in technologies related to managing computer servers and software.

SUMMARY

A variety of technologies related to managing extensibility computer servers and extensibility applications can be applied. Such technologies can be used for managing an extensibility computer server from a management computer server. For example, the extensibility computer server can be discovered using a management application on the management computer server. An extensibility agent can be installed on the extensibility computer server from the management computer server. The extensibility agent can be configured to provide status information about the extensibility computer server and to allow a different computer server to backup the extensibility computer server.

Task templates can be displayed in a user interface of the management application to manage an extensibility application on the extensibility computer server (e.g., by displaying a user interface of the extensibility application at the management computer server). Task templates for managing extensibility computer servers and extensibility applications can also be downloaded from a remote task update server, stored in a tasks database, and displayed in a user interface of the management application.

Such technologies can be used for managing applications or services (e.g., extensibility applications or services) from a management computer server. For example, an extensibility application can be discovered using a management application on the management computer server. One or more tasks can then be created (e.g., via task templates) for managing the extensibility application.

Such technologies can also be used for managing extensibility applications on extensibility computer servers from a management computer server. For example, an entity group representing a plurality of extensibility computer servers can be displayed in a user interface of a management application on the management computer server. A selection of the entity group can be received, and based on the selection a plurality of extensibility computer servers, and a plurality of task templates associated with the selected plurality of extensibility computer servers, can be displayed.

The foregoing and other objects, features, and advantages of the invention will become more apparent from the following detailed description, which proceeds with reference to the accompanying figures.

DETAILED DESCRIPTION OF EXEMPLARY EMBODIMENTS

Example 1

Exemplary Task

Figure 1:
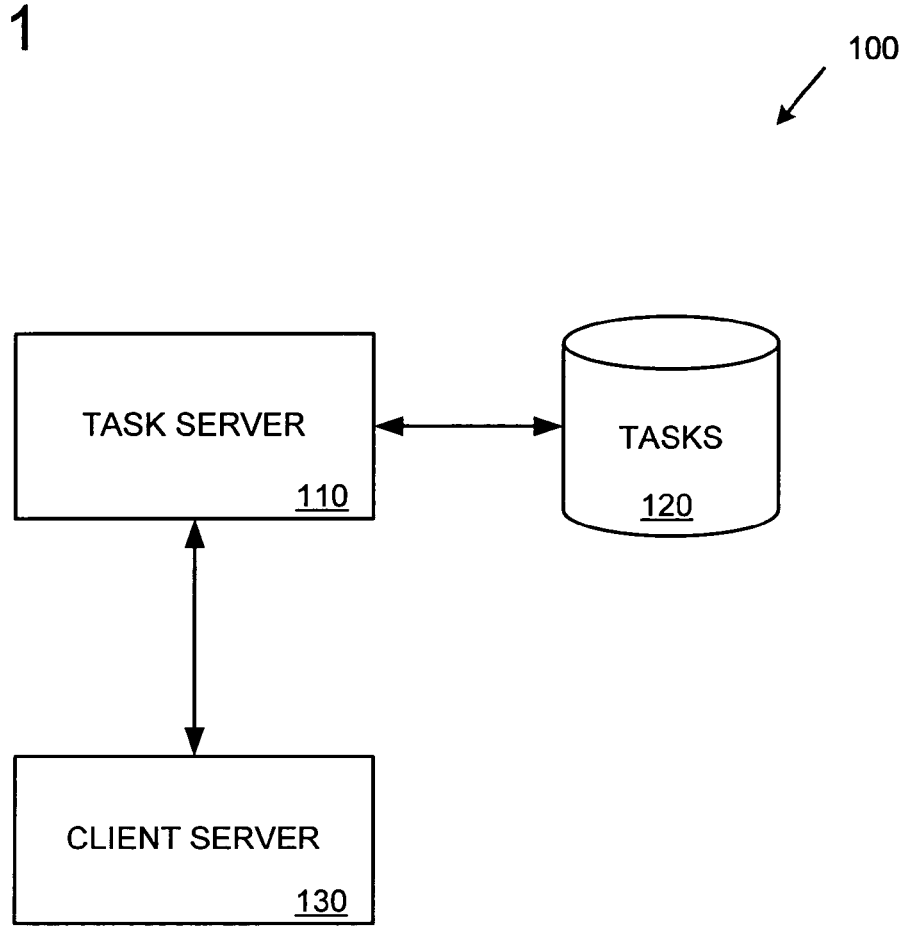
FIG. 1 is a diagram showing an exemplary system for updating task templates.

In any of the examples herein, a task can represent work that is performed on a computer network (e.g., a multi-server computer environment of a business or organization). In this way, tasks can be used to manage a computer network.

For example, a task can represent the retrieval of information that is displayed to a user of the network (e.g., for troubleshooting purposes). A task can represent making a change to the network (e.g., changing settings, such as configuration settings). A task can represent the retrieval of help and FAQ information. A task can also represent activities such as: upgrading software, purchasing licenses, and adding hardware devices.

A task can be performed, for example, by using a task template. For display purposes, a user interface element (e.g., a button, link) can be displayed for initiating a task.

Selecting (e.g., invoking) a task can result in displaying a user interface for accomplishing (e.g., completing) the task. For example, selecting a task (e.g., by selecting a user interface element associated with the task) can result in displaying a custom user interface that allows a user to make changes to a number of applications and computer servers on a network. For example, selecting a "manage licenses" task (e.g., selecting a button or link associated with the text "manage licenses") can result in display of a custom user interface that allows a user of a network to manage licenses for users and devices across multiple servers and services. Selecting a task can also result in display of a user interface that is part of an application on a network (e.g., a user interface that is already native to an application). For example, selecting a "change password" task for a selected user can result in display of a "change password" user interface from a user management application.

Selecting a task can result in display of various types of user interfaces. For example, a wizard user interface can be displayed (e.g., where the user is directed through a series of step). A dialog can be displayed (e.g., the user can be asked to confirm the deletion of a user account). A view can also be displayed (e.g., a page allowing the user to configure various settings, such as web site settings).

Tasks can be combined in various ways. For example, tasks can be linked (e.g., chained) together such that one task leads to another, and so on.

Example 2

Exemplary Task Template

In any of the examples herein, a task template can be used to accomplish (e.g., complete) a task. For example, a task template can be used to direct a user to a user interface for accomplishing a task. For example, a task template can comprise a location variable. The location variable can contain a location. The location can represent (e.g., be an address of) a user interface (e.g., a wizard, dialog, or view). For example, the location can represent a user interface by way of an API of an application. A task template can be in the format of a schema (e.g., an XML or XrML schema).

A task template can also be stored in a variety of ways and in a variety of locations. For example, task templates can be stored as data values in a tasks database (e.g., on a computer server). Task templates can also be stored as schemas (e.g., in a database, file, data store, or in another data storage location), such as an XML schema.

A task template can be updated. For example, a new task template can be downloaded to allow a user to accomplish the new task associated with the new task template. A task template can be downloaded in order to replace an existing task template (e.g., to provide updated functionality or to support a change to an application identified by a location variable of the task template). A task template can also be deleted or removed (e.g., from a tasks database on a computer server).

A task template can be used when a task is selected (e.g., invoked). For example, a task to add a new user to a network can be selected. In response, a location variable from a task template related to the task can be used to display a user interface identified by the location variable.

Selecting (e.g., invoking) or displaying a task template can comprise selecting or displaying an instance of the task template (e.g., displaying a user interface for accomplishing a task). An instance of a task template can be a specific occurrence of the task template. For example, a first instance of a task template can be displayed when a task template is selected (e.g., from a context-free task), and based on a location variable from the task template, a user interface of an application is displayed. A second instance of the same task template can also be displayed when the task template is selected (e.g., from a contextual task). In this way, multiple instances of the same task template can be selected and displayed.

The same task can be selected multiple times and multiple instances of the same task template displayed (e.g., at different times or at the same time). For example, an add user task can be selected multiple times and multiple instances of an add user task template can be displayed (e.g., multiple windows in a user interface, each window comprising fields for adding a user, such as: user name, real name, and password).

Or, different tasks can be selected and multiple instances of the same task template displayed. For example, an edit user task for a specific user can be selected and an instance of an edit user template can be displayed (e.g., filled in with the specific user's information). An edit user task for a different specific user can also be selected and an instance of the same edit user template can be displayed (e.g., filled in with the different specific user's information).

Example 3

Exemplary Updating Task Templates

In any of the examples herein, a task can be kept up to date by updating task templates used to accomplish the task. For example, a customer (e.g., an individual, business, or organization) can purchase computer hardware and software (e.g., to be used in operating a business). The software can comprise a management application for managing (e.g., via tasks which are accomplished by task templates) a collection of applications across a number of computer servers (e.g., a number of computer servers comprising a multi-server system). The management application can be sold with a set of pre-installed task templates (e.g., by the software manufacturer) for accomplishing tasks. However, the pre-installed task templates may soon become out of date (e.g., as applications are updated with new features and functionality or as new applications are installed). In addition, the specific pre-installed task templates may not be useful to some customers. Therefore, updating task templates is an important aspect to maintaining their usefulness.

Task templates can be updated for a variety of reasons. An application can change (e.g., new features added), and in order for an existing task template to operate correctly with the new application (e.g., to display the correct user interface of the application), it can need to be updated. New task templates can be created to address the needs (e.g., workflow requirements) of specific customers (or specific types, groups, or categories of customers). For example, a new task template can be created for customers that operate high employee turnover businesses (e.g., hotel operations). Task templates can also be updated for many other reasons (e.g., task templates can be updated with a better recommended way to complete the task).

Updated task templates can be created and provided by a software manufacturer. For example, a software manufacturer that develops and sells a suite of server applications (including a management application that uses task templates to manage the server applications) can provide updated task templates to maintain the usefulness of the suite of server applications over its lifetime (e.g., 3-5 years). The software manufacturer can have employees dedicated to keeping task templates up to date (e.g., due to software changes) and developing new task templates.

Task templates can be updated by providing a list of recommended task templates (e.g., recommended based on various attributes of a customer, such as the types of tasks the customer performs). Task templates can also be updated by providing a list of optional task templates (e.g., task templates that are not specifically recommended by a task update server, but nevertheless may be of interest to a customer).

A customer can update task templates in a variety of ways. For example, a customer can connect to a remote task update server and download updated task templates. A customer can obtain updated task templates on removable storage media (e.g., a CD or DVD). A customer can also obtain updated task templates in other ways (e.g., via email).

Example 4

Exemplary Patterns of Task Usage

In any of the examples herein, patterns of task usage can be identified. Patterns of task usage can be identified by tracking the task templates that are used by a user (or a group of users) of a computer server (e.g., using a management application on the computer server to manage various applications). Patterns of task usage can also be tracked based on the frequency of usage.

Patterns of task usage can be stored on a computer server (e.g., the computer server on which the task templates were invoked). Patterns of task usage can also be transmitted to a remote server (e.g., to a remote task update server of a software manufacturer).

Patterns of task usage can be analyzed (e.g., to identify trends of task usage or to recommend task template updates). For example, if a specific user (e.g., an IT administrator) frequently uses task templates to add, edit, or delete user accounts, the pattern of task usage can be analyzed to determine that the specific user often deals with user account management requests. Based on this pattern, the user can receive task template recommendations. For example, the user can receive a recommendation to download an updated task template for simplifying user account management (e.g., for more efficiently working with groups of accounts).

Profiles can be created based on patterns of task usage. For example, if a user frequently uses task templates to add, edit, or delete user accounts, a profile associated with the user can indicate high user turnover. The profile can then be used, for example, to recommend task template updates.

Example 5

Exemplary Profile

In any of the examples herein, a profile can be created and used to recommend task template updates. A profile can be created based upon a pattern of task usage. For example, if a user frequently uses task templates to add, edit, or delete user accounts, a profile can be created and associated with the user (or an existing profile associated with the user can be updated) indicating that the user is involved with a high user turnover business. The profile can then be used, for example, to recommend task template updates. For example, other task templates associated with user management in a high turnover business can be recommended.

A profile can also be created by a software manufacturer. For example, a software manufacturer can create a "high turnover" profile or a "mobile users" profile. Task templates or groups of task templates can be associated with a profile. For example, a software manufacturer can associate task templates for managing user accounts with a "high turnover" profile.

A profile based upon a pattern of task usage can be created locally or remotely. For example, a management application of a multi-server system of a business can locally create and store profiles based on task template usage. In addition, patterns of task usage can be transmitted to a remote location. For example, patterns of task usage can be transmitted to a remote task update server (e.g., operated by a software manufacturer). The remote task update server can analyze the patterns of task usage and, based on the analysis, create a profile (or use an existing profile that matches the pattern) and recommend task template updates to a customer of the software manufacturer (e.g., a customer using software developed by the software manufacturer to operate a multi-server system). A profile can be created locally and then transmitted to a remote task update server.

A profile can also be created or assigned in other ways. For example, a profile can be created or assigned based upon information provided by a user (e.g., characteristics of a user's business, various categories or groups of task templates the user is interested in, or other information about the types of tasks performed by the user). This type of profile can be defined by the user's manual selection of preferences. For example, the user can select a business category (e.g., hotel, restaurant, medical, financial, retail). A user can select characteristics of the user's business (e.g., high employee turnover, branch offices). A user can select a category or group of task templates that the user is interested in (e.g., user management, network administration). A user can also select a pre-created profile (e.g., a profile created by a software manufacturer) that matches the type of activities the user expects to perform (e.g., high turnover, mobile users).

A profile can be used to recommend task template updates. For example, if a profile indicates a high turnover business (e.g., a "high turnover" profile), then task template updates related to user management can be recommended (e.g., task templates that a software manufacturer has associated with a "high turnover" profile). If a profile indicates mobile users, then task template updates related to maintaining mobile computer patch updates can be recommended.

One or more profiles can be associated with a user or customer (e.g., individual user, business, organization).

Example 6

Exemplary Groups of Task Templates

In any of the examples herein, task templates can be organized into groups. A group can be identified by a group name, such as: "user management" or "network administration." A task template can be assigned to (e.g., associated with) a group by, for example, recording a group name in a group name field of the task template (where the task template is defined by a schema comprising the group name field). For example, one or more task templates associated with managing user accounts can be grouped into a user management group. Groups can be associated with profiles. For example, a "user management" group of task templates can be associated with a "high turnover" profile.

Groups of Task Templates can be updated. For example, a user can select and download a group of task templates by making a single selection of the group, without having to select multiple individual task templates.

Example 7

Exemplary Discovery of Task Templates

In any of the examples herein, task templates can be discovered (i.e., a customer can learn that updated task templates are available). Task templates can be discovered in a variety of ways. Task templates can be discovered based on a recommendation of task templates. For example, a recommendation can be based on a pattern of task usage. A recommendation can also be based on a profile. In this way, automated recommendations of task template updates can be made. For example, a remote task update server can automatically make recommendations of task template updates based on a profile of a user connected to (e.g., communicating with) the remote task update server. The user can be informed of these recommendations through a notification mechanism, such as email or through the management server user interface.

Task templates can be discovered based on a subscription. A subscription can comprise a subscription parameter that indicates a frequency at which to check for task template updates (e.g., with a remote task update server) as well as the preferred content of the subscription. For example, a subscription associated with a user, computer, or application can automatically check (e.g., without any involvement by a user) for task template updates on a periodic schedule (e.g., weekly or monthly). If task template updates are available (e.g., recommended task template updates based on a profile), then the updates can be automatically downloaded and stored. Or, if task template updates are available, a user can be prompted to download the updates as part of an automated process. In determining whether updates (recommended or optional) are available, a profile can be checked. For example, a management application can be associated with a subscription that checks weekly for task template updates. Recommended task template updates based on a profile associated with the management application can then be presented (e.g., and automatically downloaded or downloaded after confirmation).

Task templates can be discovered using a task update tool (e.g., a wizard). For example, a user can use a task update tool (e.g., a computer application providing a user interface) to access a remote task update server. The task update tool can communicate with the remote task update server and list available task templates, such as recommended (e.g., based on a profile) task templates and optional (e.g., task templates that do not match a profile) task templates. The user can then make a selection (e.g., by using checkboxes in a user interface) and proceed to download the selected task templates. Task templates can be selected individually or as groups of task templates.

Task templates can also be discovered via a web site of available task templates. For example, a user can visit a web site and view a list of available task templates (e.g., after providing licensing information to authorize the user to view and download the task templates).

Task templates can also be discovered through notifications systems, such as an automated email or through an alert or message that appears in the management server user interface.

Example 8

Exemplary Distribution of Task Templates

In any of the examples herein, task templates can be distributed (e.g., downloaded, transmitted, or otherwise delivered to a customer or user of the task templates) in a variety of ways. Task templates can be distributed over a network (e.g., the Internet) from a remote task update server via a web service (e.g., over a secure encrypted connection). Task templates can also be distributed on removable computer media (e.g., CD, DVD, floppy disk, flash media device).

Task templates can be distributed as individual task templates, or as groups of task templates. Task templates can be distributed based on a profile or a subscription.

Example 9

Exemplary Display of Task Templates

In any of the examples herein, task templates can be displayed in a variety of ways. Task templates can be displayed in a user interface of a management application (e.g., as user interface elements for initiating the task templates).

Task templates can be organized for display purposes. Task templates can be grouped for display based on properties of the task templates (e.g., fields of task templates defined by a schema). For example, task templates can be grouped for display based upon the relative time (e.g., date and time) each task template was downloaded or installed (e.g., a "latest 5 tasks" list). Task templates can be display based on user-defined groupings (e.g., a "my favorite tasks" list). Task templates can also be displayed based on other criteria (e.g., how often the task template is invoked, based on an RSS (Really Simple Syndication) feed).

Example 10

Exemplary Management of Task Templates

In any of the examples herein, task templates can be managed in a variety of ways. Cleanup rules can be created to manage task templates. For example, a cleanup rule (e.g., a business rule) can be used to remove task templates (e.g., by deleting or moving to a recycle folder) that have not been used (e.g., invoked) for a period of time (e.g., a month or year). Task templates can also be manually removed or deleted.

Example 11

Exemplary Task Template Update System

FIG. 1 shows an exemplary system 100 for updating task templates. In the example, a task server 110 (e.g., a remote task update server) can provide task template updates (e.g., present available task template updates) to a client server 130 (e.g., a computer server of a customer). The task server 110 can obtain task template updates from a tasks database 120.

The task server 110 can be operated by a software manufacturer. The software manufacturer can periodically update task templates in the tasks database 120. A customer of the software manufacturer can connect to the task server 110 via the client server 130 to update task templates (e.g., to select and download task template updates to replace existing task templates or install new task templates).

The task server 110 can be located remotely from the client server 130. For example, the client server 130 can communicate with the task server 110 over the Internet.

Example 12

Exemplary Task Usage System

Figure 2:
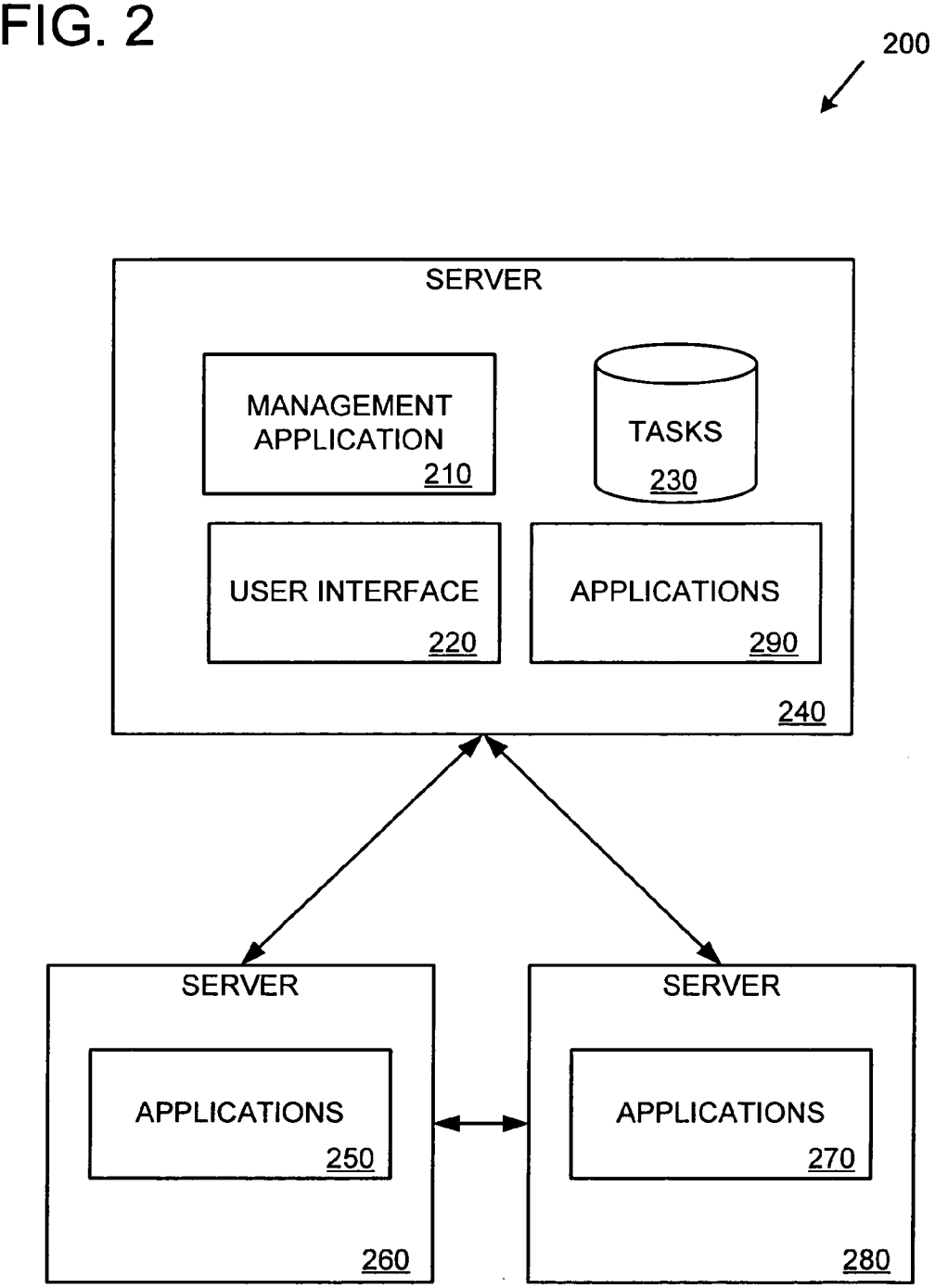
FIG. 2 is a diagram showing an exemplary system for using tasks.

FIG. 2 shows an exemplary system 200 for using tasks. In the example, a management application 210 (e.g., a server application) can run on a computer server 240. For example, the management application 210 can be an application for managing a collection of applications (e.g., 250, 270, and 290) (e.g., a server applications) designed to operate a multi-server computer system (e.g., providing services to a business or organization). The collection of applications can include, for example, email applications, file serving applications, remote access applications, user management applications, licensing applications, and monitoring applications. Different servers of the multi-server computer system can run different applications from the collection of applications. For example, the multi-server computer system can comprise three servers: a management server (e.g., 240), an email server (e.g., 260), and a firewall server (e.g., 280). The management application 210 can be located on the management server (e.g., 240) and manage applications on the same server as well as applications on different servers (e.g., 260 and 280).

The management application 210 can be used to manage servers (e.g., by managing server applications running on the servers) using tasks 230 (e.g., where the tasks are accomplished by task templates). Tasks 230 can be stored (e.g., as task templates) in a database on a computer server (e.g., on the same server as the management application, or on a different server). Tasks 230 can also be stored in other ways (e.g., in a flat file, on removable media, as an XML schema).

The management application 210 can provide a user interface 220 allowing a user to access tasks 230 (e.g., to access task templates for accomplishing the tasks). For example, the user interface 220 of the management application 210 can display tasks 230 (e.g., displayed as user interface elements for initiating the tasks) in a variety of forms, such as a context-free task list or a contextual task list. The user interface 220 can also display entities and entity groups. For example, a user can select an entity or entity group from the user interface 220 to display contextual tasks.

From the user interface 220, a user can select (e.g., invoke) a task 230 (e.g., by selecting a user interface element for initiating the task) to manage (e.g., display information from, make a change to) an application. For example, the user can select a task 230 to manage applications 290 on the same computer server 240 that the management application 210 is operating on. The user can also select a task 230 to manage an application on a different computer server (e.g., manage applications 250 on a computer server 260, or manage applications 270 on computer server 280).

The user interface 220 can also support different options, procedures, or techniques for navigating to tasks 230 (e.g., navigating to task templates associated with, and used to accomplish, the tasks). For example, the user interface 220 can support an option for navigating to a task by displaying a context-free task (e.g., displaying a context-free task on a home page of the user interface 220 where the user has not selected an entity or entity group). The user interface 220 can support an option for navigating to a task based on a selection of an entity group and then displaying a contextual task. The user interface 220 can also support an option for navigating to a task based on a selection of an entity from an entity group and then displaying a contextual task.

Example 13

Exemplary Method for Updating a Task Template

Figure 3:
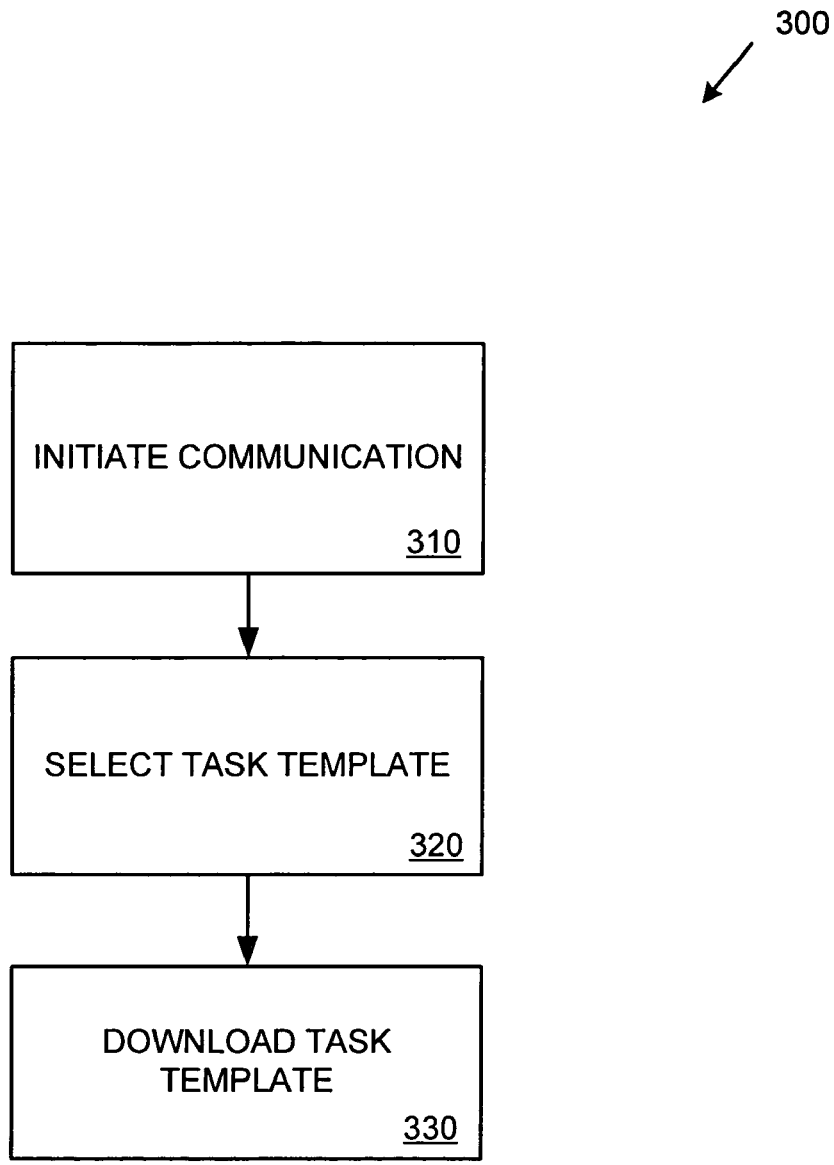
FIG. 3 is a flowchart showing an exemplary method for updating a task template.

FIG. 3 shows an exemplary method 300 for updating a task template, and can be performed, for example, by a system such as that shown in FIG. 1. At 310, communication is initiated (e.g., from a management application running on a local client server to a remote task update server). At 320, a task template is selected (e.g., from a list of available task templates presented by the remote task update server). At 330, the selected task template is downloaded (e.g., downloaded to the local client server for use by the management application running on the local client server for managing applications of a multi-server system).

Example 14

Exemplary Remote Task Template Update System

Figure 4:
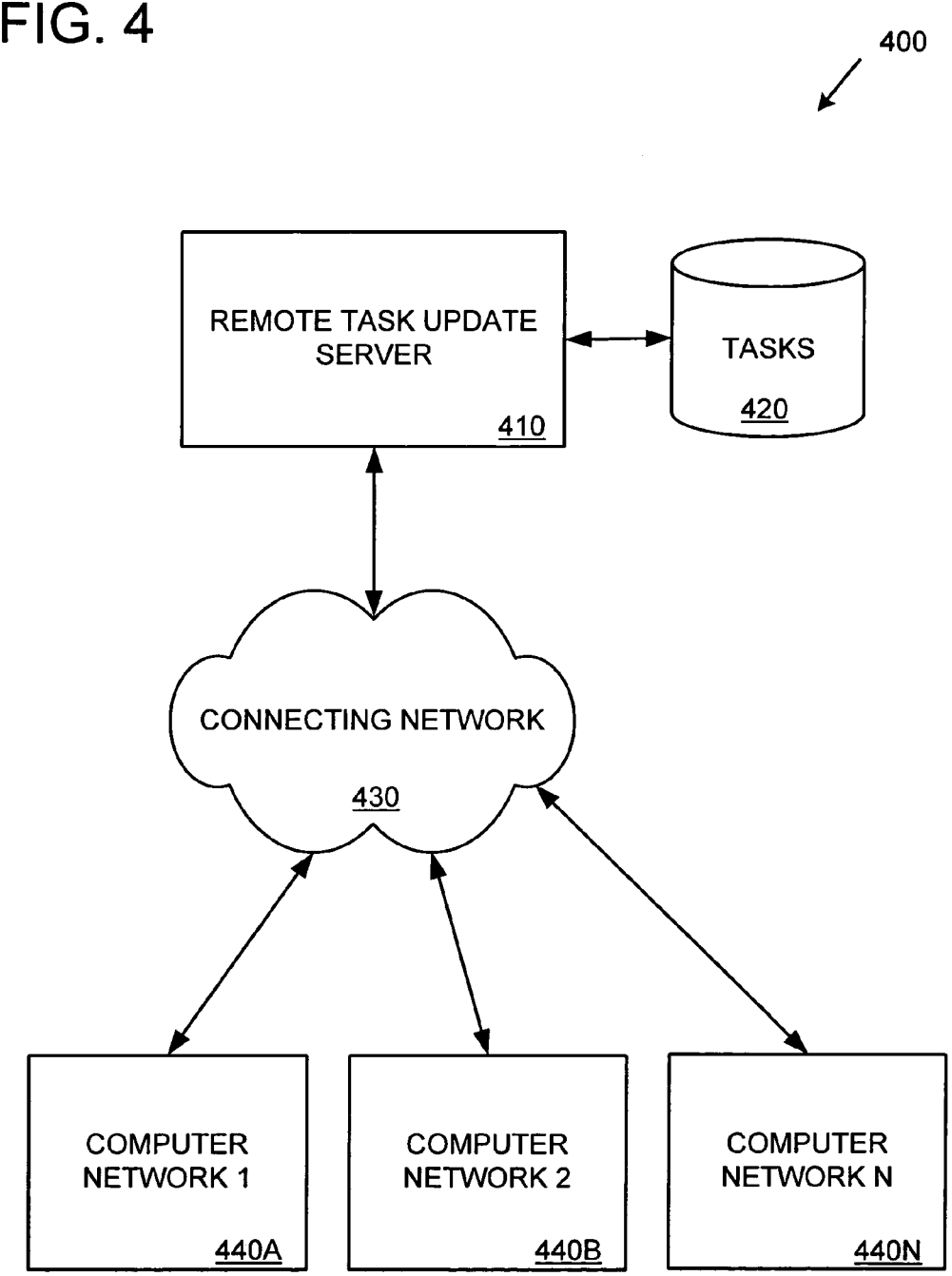
FIG. 4 is a diagram showing an exemplary system for remote task template updating.

FIG. 4 shows an exemplary system 400 for remote task template updates. In the example, a remote task update server 410 can provide task template updates (e.g., present available task template updates) to a variable (e.g., arbitrary) number of computer networks (e.g., 440A-N). A computer network (e.g., 440A, 440B, or 440N) can be a computer network of a business or organization. A computer network (e.g., 440A, 440B, or 440N) can comprise a single network (e.g., at a single location) or multiple networks (e.g., at varying locations, such as remote office locations).

The remote task update server 410 can connect to the computer networks over a connecting network 430 (e.g., a public network such as the Internet or a private network such as a leased line).

The remote task update server can provide task template updates from a tasks database 420. Task templates can be stored in the tasks database 420 in a format defined by a schema (e.g., an XML schema).

For example, the remote update server 410 and task database 420 can be operated by a software manufacturer that sells a software package comprising applications for operating computer services of a business or organization (e.g., email services, fie sharing services, firewall services, anti-virus services, licensing services). The applications of the software package can be managed by tasks which are accomplished by task templates. Customers (e.g., 440A, 440B, and 440N), such as businesses or organizations, that purchase the software package from the software manufacturer can obtain task template updates from the remote task update server 410 operated by the software manufacturer. In this way, a software manufacturer can maintain the usefulness of tasks for operating a software package sold and supported by the software manufacturer.

A user of a computer network (e.g., 440A, 440B, and 440N) can define a schedule for obtaining (e.g., downloading) task template updates from the remote task update server 410 (e.g., a schedule to download any new task template updates at midnight once a week). A notification can be displayed informing the user that the download is about to begin. The notification can allow the user to defer the download to a later time.

Example 15

Exemplary User Interface Depicting a Task Profile Tool

Figure 5:
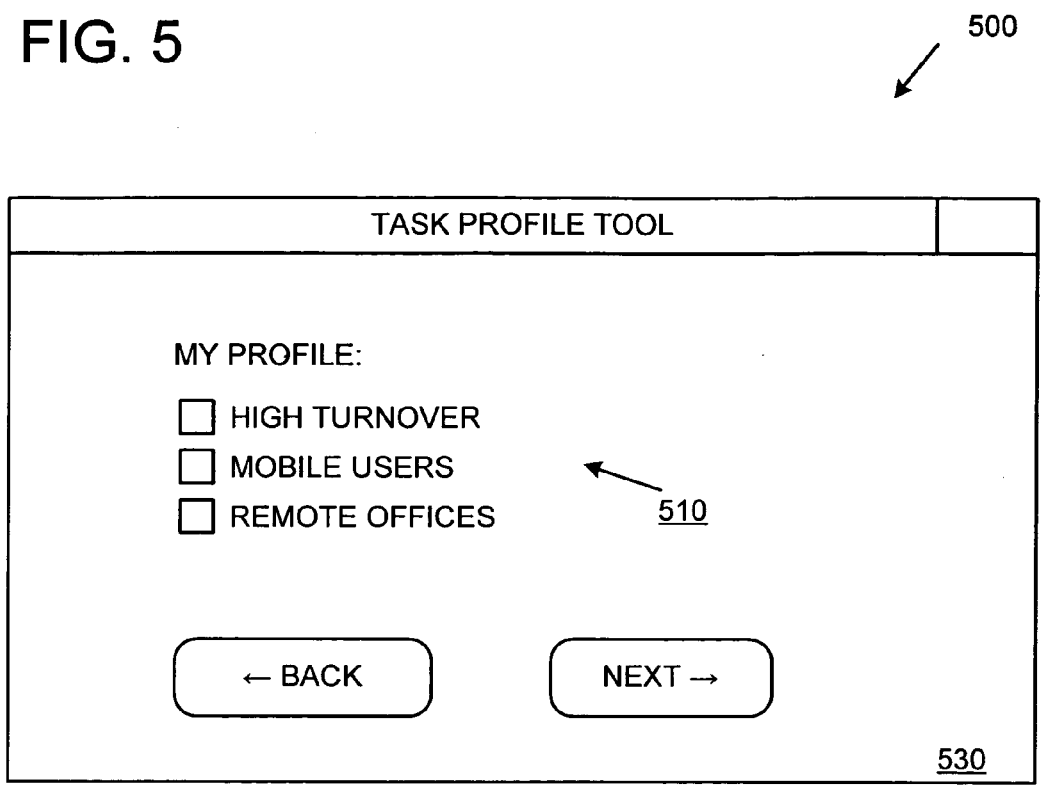
FIG. 5 is a diagram showing an exemplary user interface depicting a task profile tool.

FIG. 5 shows an exemplary user interface 500 depicting a task profile tool. The user interface can be displayed, for example, by a system such as that shown in FIG. 1. The task profile tool 500 can be displayed during a software setup process (e.g., displayed while installing and configuring a software package comprising multiple applications to operate a multi-server system). The task profile tool 5 can operate as a wizard.

In the user interface 530, a list of profiles 510 are displayed (e.g., to a user during the software setup process). The list of profiles 510 can include, for example, "high turnover," "mobile users," and "remote offices." A user can select one or more profiles that match characteristics of the user or the user's business. For example, if the user is involved in a high employee turnover business, the user can select the "high turnover" profile and the profile will then be associated with the user, or more generally with the user's business or organization.

The profiles selected using the task profile tool 500 can be used to install and configure task templates (e.g., used to determine which task templates are to be installed during initial software setup, how they will be grouped, and how they will be displayed in a user interface). The profiles selected can also be used later to recommend task template updates.

The task profile tool 500 can be used after initial software setup has been completed. Generally, the task profile tool 500 can be used anytime a user or customer wants to change profiles associated with the user or customer.

Example 16

Exemplary Method for Recommending Task Templates Using a Profile

Figure 6:
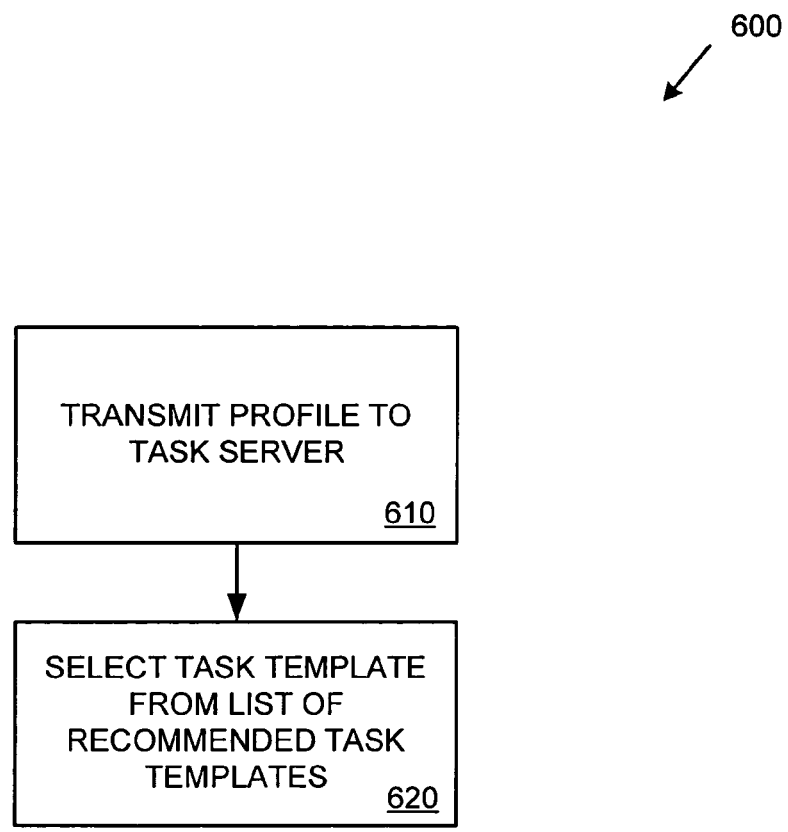
FIG. 6 is a flowchart showing an exemplary method for recommending task templates using a profile.

FIG. 6 shows an exemplary method 600 for recommending task templates using a profile. At 610, a profile is transmitted to a task server (e.g., to a remote task update server). The profile that is transmitted to the task server can indicate a pattern of task usage (e.g., high turnover, mobile users, or remote offices). At 620, a task template is selected from a list of recommended task templates, where the recommended task templates are recommended based on the profile (e.g., where the recommended task templates have been associated with the profile by a software manufacturer). For example, if the profile is "high turnover", the recommended task templates can comprise task templates directed to user management.

Example 17

Exemplary Update Tasks User Interface

Figure 7:
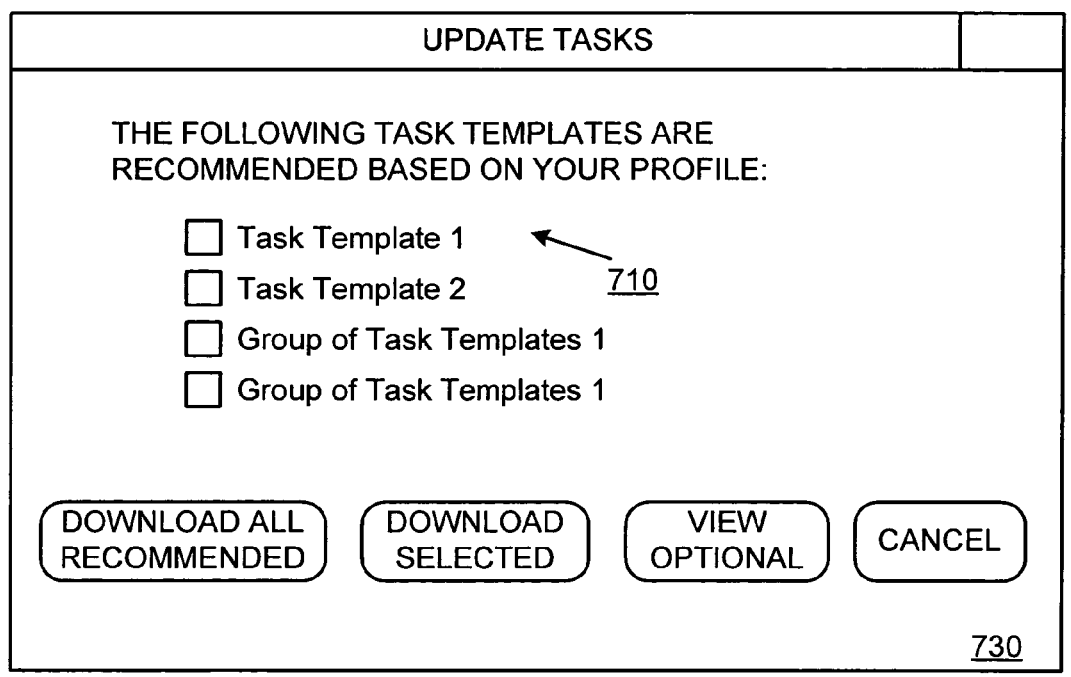
FIG. 7 is a diagram showing an exemplary update tasks user interface.

FIG. 7 shows an exemplary update tasks user interface 700. The user interface can be displayed, for example, by a system such as that shown in FIG. 1. In the user interface 730, a list of recommended task templates based on a profile are displayed 710. A list of recommended task templates can also be displayed based on more than one profile associated with a user or customer. The list of recommended task templates 710 can comprise individual task templates (e.g., "task template 1" and "task template 2) and task template groups (e.g., "group of task templates 1" and "group of task templates 2).

The recommended task templates 710 can be associated with checkboxes in the user interface so that a user can select any of the individual or group recommended task templates.

Also displayed in the user interface 730 are user interface controls allowing a user to control the task update process. For example, the user can select a user interface control to automatically download all recommended task templates 710 displayed in the user interface 730 (e.g., using a "DOWNLOAD ALL RECOMMENDED" button). The user can select a user interface control to download only selected (e.g., via a checkbox) task templates or groups of task templates (e.g., using a "DOWNLOAD SELECTED" button). The user can select a user interface control indicating the user would like to view available task templates that have not been recommended (e.g., using a "VIEW OPTIONAL" button). Non-recommended (e.g., optional) task templates can also be displayed in the same user interface along with the recommended task templates. The user can also select a user interface control if the user is not interested in downloading any task templates (e.g., using a "CANCEL" button).

Example 18

Exemplary Method for Updating Task Templates Using a Task Update Tool

Figure 8:
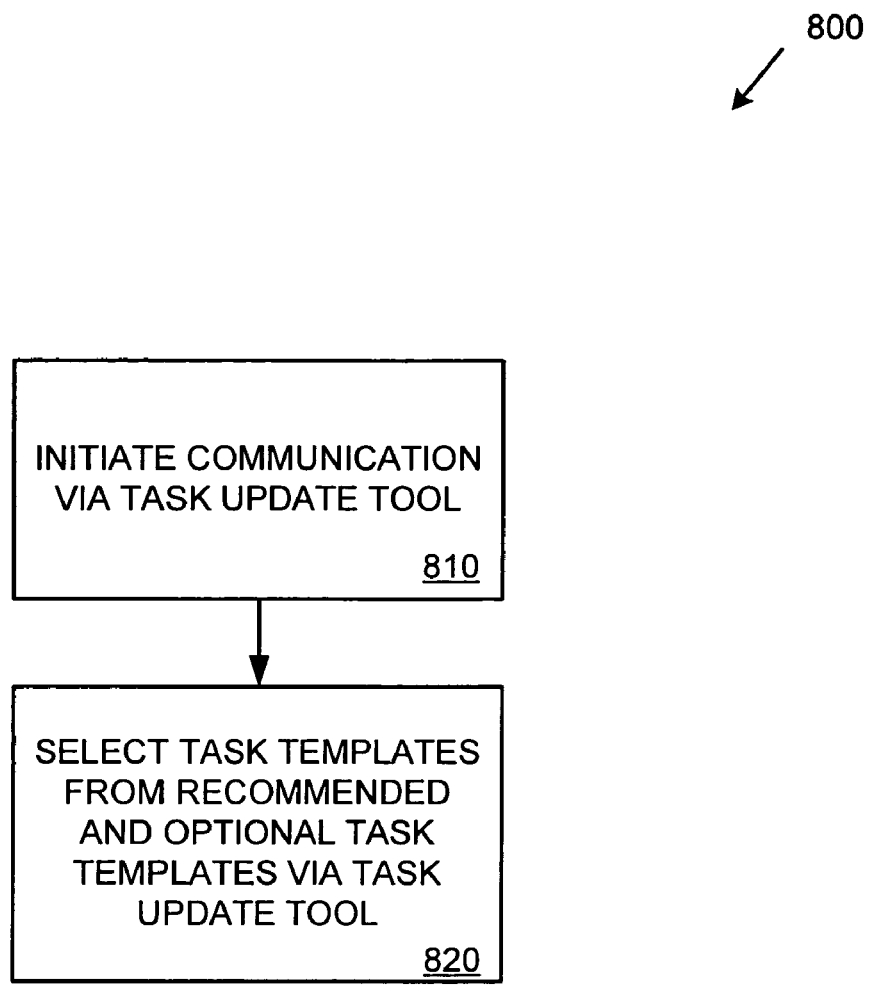
FIG. 8 is a flowchart showing an exemplary method for updating task templates using a task update tool.

FIG. 8 shows an exemplary method 800 for updating task templates using a task update tool (e.g., a wizard). At 810, a communication to a task update server (e.g., a remote task update server) is initiated by the task update tool (e.g., by connecting to a web service of the remote task update server over the Internet). For example, the task update tool can be a component of a management application. A task update tool can also be a stand-alone application. The task update tool can initiate communication based on input received from a user (e.g., by a user running the task update tool).

At 820, one or more task templates are selected from recommended and optional task templates displayed to a user by the task update tool. For example, the task update tool can display one or more recommended task templates (e.g., recommended based upon a profile) and one or more optional task templates (e.g., not recommended, but still available). If there are no recommended, or no optional, task templates available, then the task update tool can display only recommended task templates or only optional task templates as appropriate. A user of the task update tool can then select task templates (or groups of task templates) to download.

Example 19

Exemplary User Interface Depicting a Task Update Tool

Figure 9:
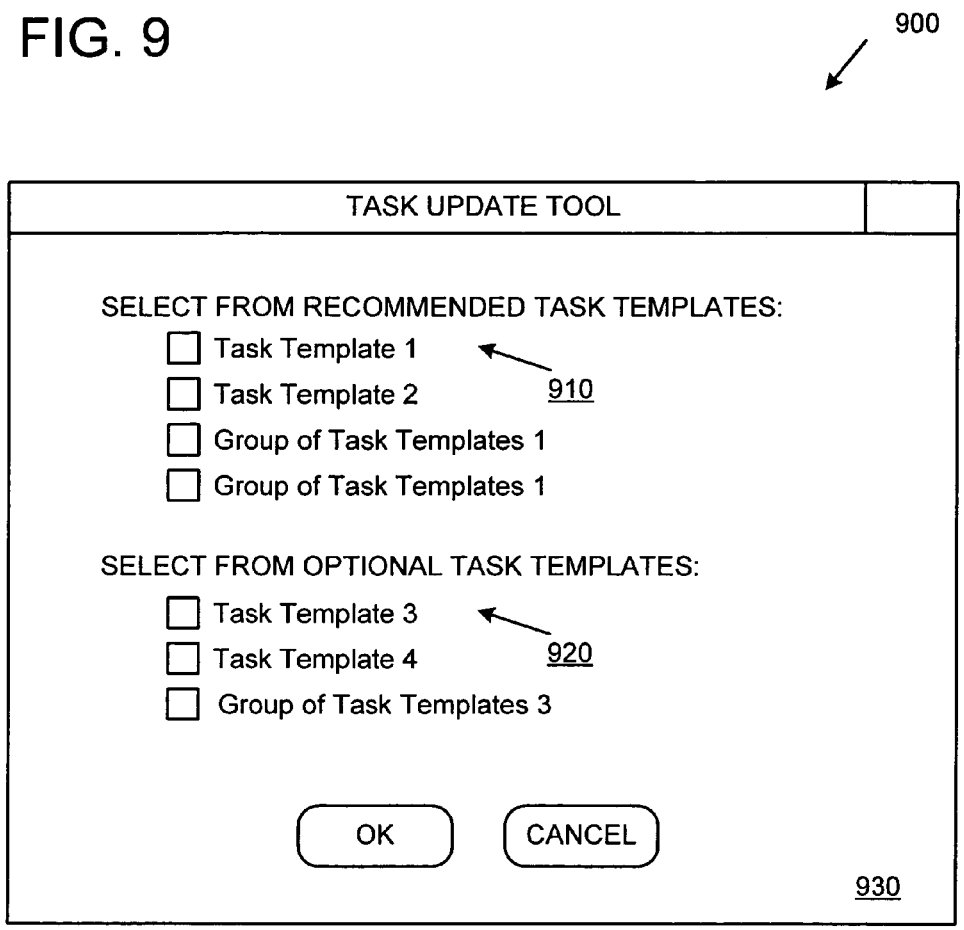
FIG. 9 is a diagram showing an exemplary user interface depicting an update tasks tool.

FIG. 9 shows an exemplary user interface 900 depicting a task update tool (e.g., a wizard). The user interface can be displayed, for example, by a system such as that shown in FIG. 1. In the user interface 930, a list of recommended task templates are displayed 910. The list of recommended task templates 910 can be displayed based on a profile of a user operating the tool. The list of recommended task templates 910 can comprise individual task templates (e.g., "task template 1" and "task template 2) and task template groups (e.g., "group of task templates 1" and "group of task templates 2). The recommended task templates 910 can be associated with checkboxes in the user interface so that a user can select any of the individual or group recommended task templates.

In the user interface 930, a list of optional task templates 920 can be displayed (e.g., task templates that are not recommended, but nevertheless may be of interest to a user of the task update tool). The list of optional task templates 920 can comprise individual task templates (e.g., "task template 3" and "task template 4") and task template groups (e.g., "group of task templates 3"). The optional task templates 920 can be associated with checkboxes in the user interface so that a user can select any of the individual or group optional task templates.

Also displayed in the user interface 930 are user interface controls allowing a user to approve (e.g., via an "OK" or "UPDATE" button) or cancel (e.g., via a "CANCEL" button) the selection of task templates. If approved, the selected task templates can be downloaded.

Example 20

Exemplary Task Template Schema

Figure 10:
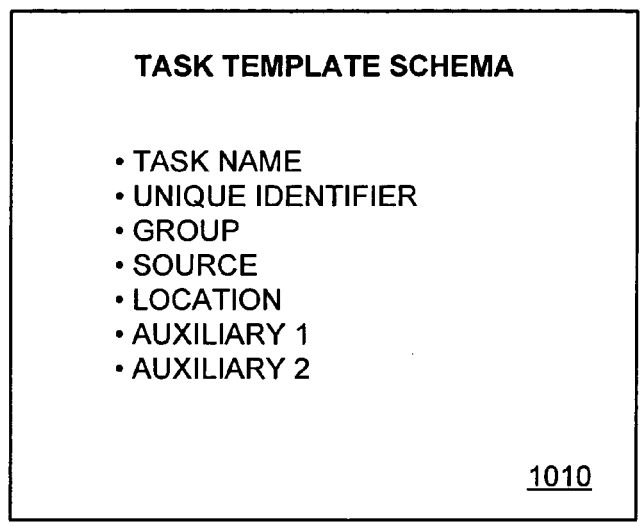
FIG. 10 is a diagram showing an exemplary task template schema.

FIG. 10 shows an exemplary task template schema 1000. The task template schema can comprise various fields 1010. The task template schema can comprise a task name field (e.g., for use when displaying the task template in a user interface for selecting or invoking the task template). The task template schema can comprise a unique identifier field for uniquely identifying the task template. The task template schema can comprise a group identifier for identifying a group of the task template. The task template schema can comprise a source field for identifying a source application. The task template schema can comprise a location identifier field for identifying a user interface of an application (e.g., by way of an API of the application). The task template schema can also comprise auxiliary fields allowing for future expansion of the task template schema.

Example 21

Exemplary Method for Updating Task Templates on a Client Server

Figure 11:
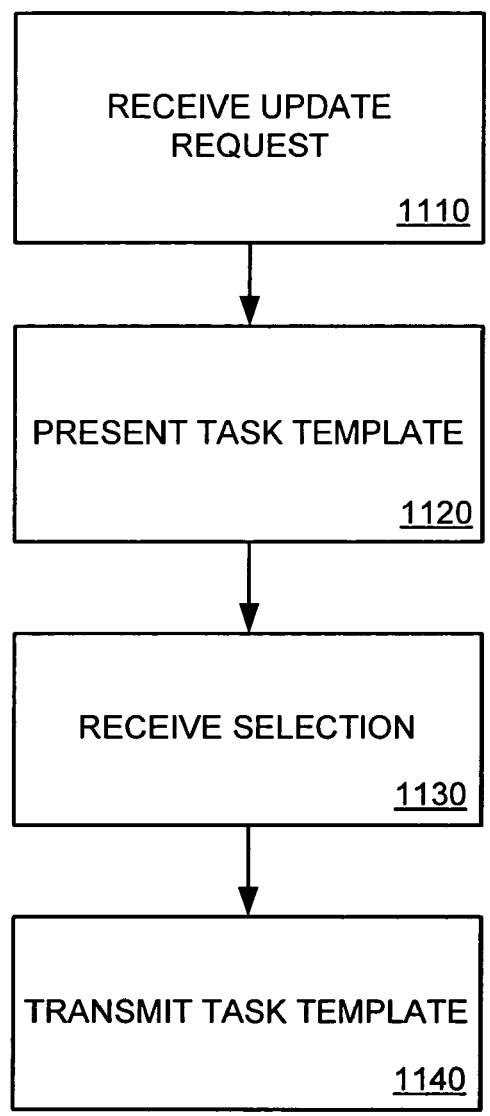
FIG. 11 is a flowchart showing an exemplary method for updating task templates on a client server.

FIG. 11 shows an exemplary method 1100 for updating task templates on a client computer (e.g., a server), and can be performed, for example, by a system such as that shown in FIG. 1. At 1110, an update request is received from a client computer. For example, the update request can be received by a remote task update server from a client computer over the Internet. The update request can comprise a profile associated with a user or customer. The update request can also include when the update actually occurs. The update can occur immediately or on a schedule.

At 1120, one or more task templates (or groups of task templates) are presented based on the request. For example, the remote task update server can present recommended task templates based on a profile received in the update request (or received prior to the update request). The remote task update server can also present optional task templates (or task templates without a recommended or optional designation, or with a different designation).

At 1130, a selection of one or more presented task templates (or groups) is received. For example, a remote task update server can receive a selection of a recommended task template by a user of the client computer.

At 1140, the selected task templates (or groups) are transmitted to the client computer. The selected task templates can be transmitted in a format defined by a schema (e.g., an XML or XrML schema).

Example 22

Exemplary Method for Recommending Task Templates Based on a Pattern of Usage

Figure 12:
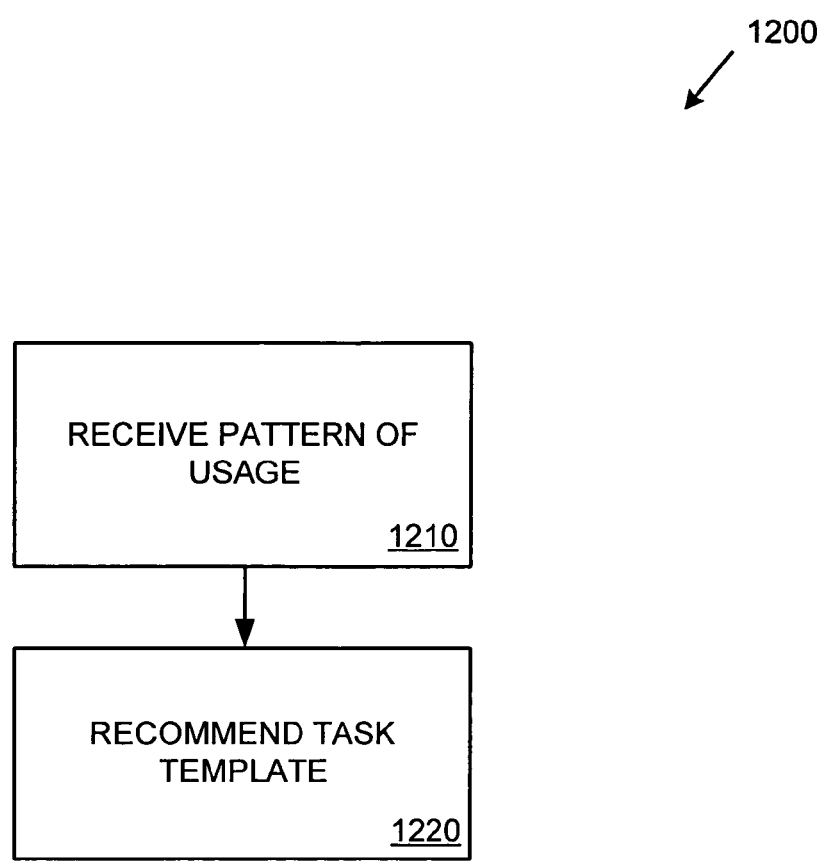
FIG. 12 is a flowchart showing an exemplary method for recommending task templates based on a pattern of usage.

FIG. 12 shows an exemplary method 1200 for recommending task templates based on a pattern of usage. At 1210, a pattern of usage is received (e.g., by a remote task update server from a client computer over the Internet). The pattern of usage can be received as part of a profile. At 1220, a task template is recommended based on the pattern of usage. For example, if the pattern of usage indicates a high turnover business, the recommended task template can be related to adding, editing, or deleting user accounts.

Example 23

Exemplary Method for Storing Task Templates

Figure 13:
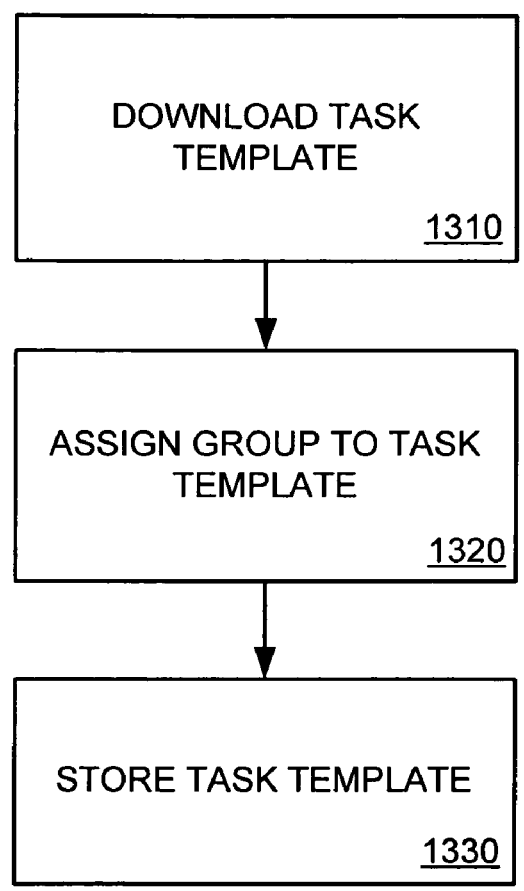
FIG. 13 is a flowchart showing an exemplary method for storing task templates.

FIG. 13 shows an exemplary method 1300 for storing task templates. At 1310, a task template is downloaded (e.g., from a remote task update server in a format defined by a schema). At 1320, a group is assigned to the downloaded task template. For example, the group can be assigned by entering a group name in a field of the task template, where the field is a group name field defined by a schema. At 1330, the downloaded task template is stored (e.g., in a tasks database in a format defined by a schema). Alternatively, the group can be assigned to the downloaded task template after it has been stored.

Example 24

Exemplary Entity

In any of the examples herein, an entity can be an object (e.g., an object associated with a computer network), a solution (e.g., a group of entities), or one or more tasks. For example, an entity can be a computer (e.g., a desktop, laptop, server), a user, a printer, a network device (e.g., switch, hub, router), a configuration setting, a license, or any other type of entity. Entities can be grouped together in entity groups.

Tasks can be performed on an entity. For example, an entity can be selected (e.g., by a user in a user interface). Selecting an entity (e.g., clicking or right-clicking on an icon representing the entity in a user interface) can display a list of tasks (e.g., a list of user interface elements for initiating the tasks). The list of tasks can be associated with the entity. A task from the list of tasks can be selected and, using an associated task template, a user interface can be displayed for completing the task.

Example 25

Exemplary Entity Group

In any of the examples herein, an entity group can comprise a collection of entities. The collection of entities can be homogeneous or heterogeneous. For example, a homogeneous users entity group can comprise a collection of user entities. A heterogeneous email entity group can comprise a collection of entities that participate in email activities, such as: users, email servers, client email applications, and server email applications.

The collection of entities can be related. For example, a network entity group can comprise a collection of entities related to the network (e.g., servers, user computers, printers).

Tasks can be performed on an entity group. For example, an entity group can be selected (e.g., by a user in a user interface). Selecting an entity group (e.g., clicking on an icon representing the entity group) can display a list of tasks (e.g., a list of user interface elements for initiating the tasks). The list of tasks can be associated with the entity group. A task from the list of tasks can be selected and, using an associated task template, a user interface can be displayed for completing the task. For example, selecting a network entity group can display a task for viewing bandwidth usage across the network (e.g., across the entities comprising the network entity group).

Example 26

Exemplary Contextual Task

In any of the examples herein, a task can be a contextual task. A contextual task can be a task that is associated with a selected entity or entity group (e.g., the task applies to or will be performed on the selected entity or entity group). For example, if a user is presented with a user interface displaying a number of entity groups, the user can select one of the entity groups. Once the user has selected one of the entity groups, a list of contextual tasks can be displayed (e.g., a list of user interface elements for initiating the contextual tasks). The list of tasks is contextual because it is associated (e.g., scoped) with the selected entity group. For example, if the user selects a network entity group, the list of contextual tasks would be associated to the network entity group. An example of contextual tasks associated with a network entity group can be: view performance, view alerts, and view events.

Similarly, for example, if a user is presented with a user interface displaying a number of entities, the user can select one of the entities. Once the user has selected one of the entities, a list of contextual tasks can be displayed. The list of tasks is contextual because it is associated (e.g., scoped) with the selected entity (e.g., the tasks apply to or will be performed on the selected entity). For example, if the user selects a specific computer server from a computer servers entity group, the list of contextual tasks would be associated with the specific computer server. An example of contextual tasks associated with a specific computer server entity can be: approve updates, configure web server, deploy new software package, view performance, view alerts, and view events. For example, the approve updates contextual task can allow a user to approve updates for the selected computer server entity.

Example 27

Exemplary Context-Free Task

In any of the examples herein, a task can be a context-free task. A context-free task can be a task that is displayed (e.g., as a user interface element for initiating the context-free task) regardless of whether an entity or entity group is selected (e.g., a context-free task is not tied to the display of an entity or an entity group). Therefore, context-free tasks can be displayed independently of contextual tasks. A context-free task can also be known as a global task.

For example, a user can be presented with a user interface in which there are no entities or entity groups selected. A list of context-free tasks can be displayed in the user interface. For example, the list of context-free tasks can include: approve updates on server 1, review email license usage, and view file server performance.

Context-free tasks can also be displayed at the same time (e.g., simultaneously, concurrently, contemporaneously) as contextual tasks. For example, a list of context-free tasks can be displayed in a user interface (where there are no entities or entity groups selected). A user can then select an entity or entity group which causes display (e.g., in a separate area of the user interface) of a list of contextual tasks. The list of context-free tasks can have a label identifying the list, as can the list of contextual tasks. The context-free tasks and contextual tasks can also be mixed (e.g., in a single list of tasks).

Displaying a list of contextual tasks can cause a list of context-free tasks to be removed (e.g., from being displayed in a user interface). For example, if a user selects an entity or entity group, then a currently displayed list of context-free tasks can be removed and a list of contextual tasks displayed instead (e.g., replaced by the list of contextual tasks in the same area of the user interface, or in a different area of the user interface).

Example 28

Exemplary Pivot

In any of the examples herein, a pivot can be the ability to switch between different options, procedures, or techniques of accessing, displaying, navigating to, or viewing entity groups, entities, or tasks (e.g., a task template, or instance of a task template, associated with the task). For example, a user can be presented with two options for accessing a task template, and the user can pivot (e.g., switch, alternate, change) between the two options. One of the two options can represent task navigation via a context-free task list, and the other option can represent task navigation via a contextual task list.

Example 29

Exemplary User Interface Depicting Display of Task Templates

Figure 14:
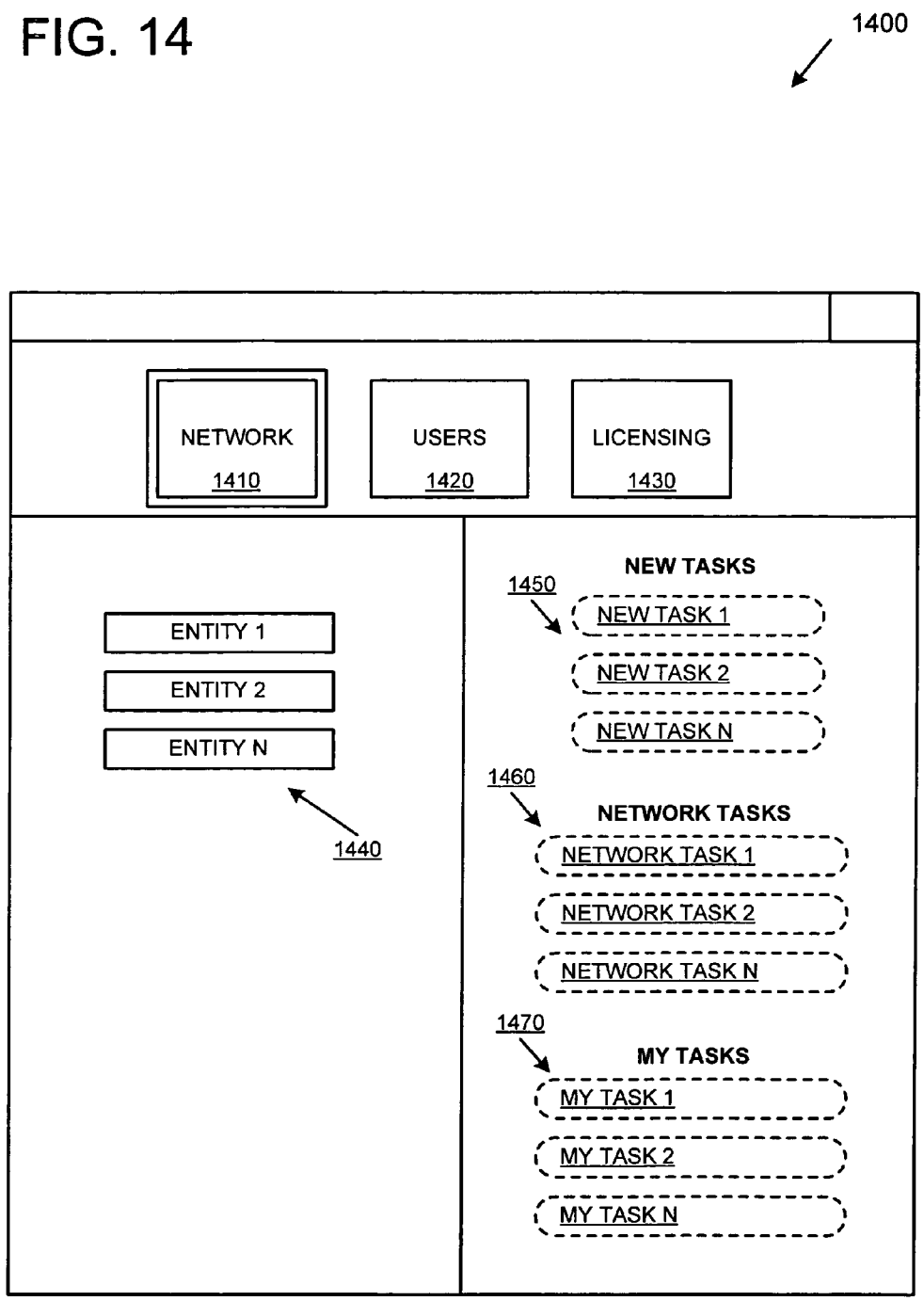
FIG. 14 is a diagram showing an exemplary user interface depicting display of task templates.

FIG. 14 shows an exemplary user interface 1400 depicting display of task templates. The user interface can be displayed, for example, by a system such as that shown in FIG. 3. In the user interface 1400, a number of entity groups are displayed: a network entity group 1410, a users entity group 1420, and a licensing entity group 1430. In the user interface 1400, the network entity group 1410 has been selected. Based on the selected network entity group 1410, a number of entities 1440 associated with the selected network entity group are displayed.

In the user interface 1400, a number of "new tasks" are displayed in a list 1450. For example, the "new tasks" 1450 can be task templates that have been recently updated. The tasks of the "new tasks" list can be contextual tasks, context-free tasks, or a mixture of both. The management application can use a visual cue, such as an icon, to distinguish a new task from one of the tasks that ships with the management server.

In the user interface 1400, a number of "network tasks" are displayed 1460. The "network tasks" can be contextual tasks displayed based on the selection of the network entity group 1410.

Also displayed in the user interface 1400 are a number of tasks designated "my tasks" 1470. For example, a user of the user interface 1400 (e.g., a user of a management application that operates the user interface) can select a number of task templates for display in the user interface 1400 under a user-defined title, such as "my tasks" 1470. These tasks can represent tasks that the user performs frequently. The tasks of the "my tasks" list 1470 can be contextual tasks, context-free tasks, or a mixture of both.

Example 30

Exemplary Method for Completing a Task

Figure 15:
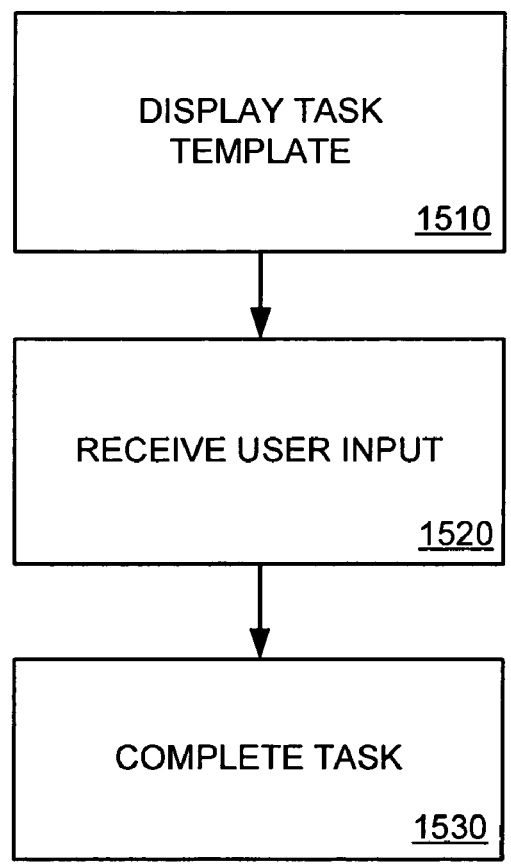
FIG. 15 is a flowchart showing an exemplary method for completing a task.

FIG. 15 shows an exemplary method 1500 for completing a task. At 1510, a task template is displayed (e.g., as an instance of the task template). For example, the task template can be displayed as a result of a user selecting a context-free task from a user interface. The task template can also be displayed as a result of a user selecting a contextual task from a user interface (e.g., after having selected an entity group or entity).

At 1520, user input is received. For example, the user input can comprise information entered by the user into a form (e.g., information such as user name, real name, and password entered in an add new user form).

At 1530, the task is completed. For example, the user can complete an add new user task by entering information into a form and clicking on an "ADD" or "OK" button.

Example 31

Exemplary Extensibility Computer Server

In any of the examples herein, an extensibility computer server can be a computer server that is not part of a collection of computer servers (e.g., a collection of integrated computer servers) running a suite of server applications (e.g., an integrated suite of server applications). For example, a customer can operate a collection of computer servers (e.g., a management server, an email server, and a firewall server) running a suite of server applications (e.g., management applications, email applications, file sharing applications, anti-virus applications, firewall applications). The collection of computer servers, and the applications running on the collection of computer servers, can be managed from one of the servers of the collection (the management computer server) via a management application. For example, a user (e.g., an IT administrator) can manage the servers of the collection, and the applications running on the servers, by invoking task templates displayed in a user interface of the management application. The task templates can be invoked to accomplish tasks (e.g., displaying alerts, editing user accounts, changing web server settings, viewing status information).

The collection of computer servers, and the applications running on the collection of computer servers, can also be managed from any or all of the servers of the collection (e.g., any or all of the servers of the collection can act as management computer servers). For example, a management application can run on any or all of the servers of the collection.

Computer servers that are not part of the collection of computer servers can also be managed. Such computer servers can be called extensibility computer servers. For example, a customer can operate one or more extensibility computer servers. The extensibility computer servers can be used to provide services in addition to those provided by the collection of computer servers running the suite of server applications. For example, if the suite of server applications does not include a specific type of application (e.g., a CRM (customer relationship management) application or a backup application) then the customer can use an extensibility server to run the application (extensibility application).

Extensibility computer servers can be managed from the collection of computer servers (e.g., by a management computer server of the collection of computer servers). For example, a user can manage the extensibility computer servers by invoking task templates displayed in a user interface of a management application running on the management computer server. As a result of invoking the task templates, user interfaces of extensibility applications running on the extensibility computer servers can be displayed at the management computer server. In this way, extensibility computer servers, and extensibility applications running on the extensibility computer servers, can be extensibly manageable.

By using extensibility computer servers, a customer can extend the range of services provided by a computer network. For example, a customer can purchase a suite of server applications, which can include a management application for managing the suite across a collection of multiple computer servers. The ability of the management application can be extended to include the management of extensibility computer servers. In this way, a customer can use a single management application on a single management computer server to manage an arbitrary number of additional extensibility computer servers (and applications running on the extensibility computer servers). This can save the customer the effort of going to an extensibility computer server, logging in, and bringing up the desired user interface of the desired application because the customer can use the management application to do so for any number of extensibility computer servers and extensibility applications.

Example 32

Exemplary Extensibility Application

In any of the examples herein, an extensibility application can be an application (e.g., a server application) that is not part of a suite of server applications (e.g., an integrated suite of server applications). For example, a customer can purchase a suite of server applications to provide services (e.g., management services, email services, file sharing services, anti-virus services, and firewall services). The customer can also purchase applications in addition to the suite of server applications to provide needed additional services. These additional applications can be known as extensibility applications. Extensibility applications can be applications (e.g., server applications) that originate from the same software manufacturer as the suite of server applications, or from a different software manufacturer.

Extensibility applications can be located on extensibility computer servers. Extensibility applications can also be located on other computer servers (e.g., computer servers that are part of a collection of computer servers running the suite of server applications).

Extensibility applications can be managed from a management application (e.g., running on a management computer server of the collection of computer servers running the suite of server applications). For example, a user of the management application can discover the extensibility applications and use task templates to accomplish tasks for managing the extensibility applications (e.g., to display a user interface of the extensibility application at the management computer server).

Example 33

Exemplary Extensibility Agent

In any of the examples herein, an extensibility agent can be installed on an extensibility computer server and used to manage the extensibility computer server or extensibility applications on the extensibility computer server.

For example, a user using a management application on a management computer server can discover an extensibility computer server. The user can select the extensibility computer server to manage, and as a result, an extensibility agent can be installed (e.g., from the management computer server) on the selected extensibility computer server. The extensibility computer server, and extensibility applications on the extensibility computer server, can then be managed via the extensibility agent. For example, the extensibility agent can provide status information regarding the status of the extensibility computer server, or extensibility applications on the extensibility computer server, to the management application on the management computer server. Status information can include, for example, information regarding events (e.g., alerts), software update status (e.g., software patch updates), health, and performance. The extensibility agent can also allow a different computer server to backup the extensibility computer server. For example, the different computer server can backup one or more computer storage devices of the extensibility computer server via the extensibility agent.

Example 34

Exemplary Extensibility Management System

Figure 16:
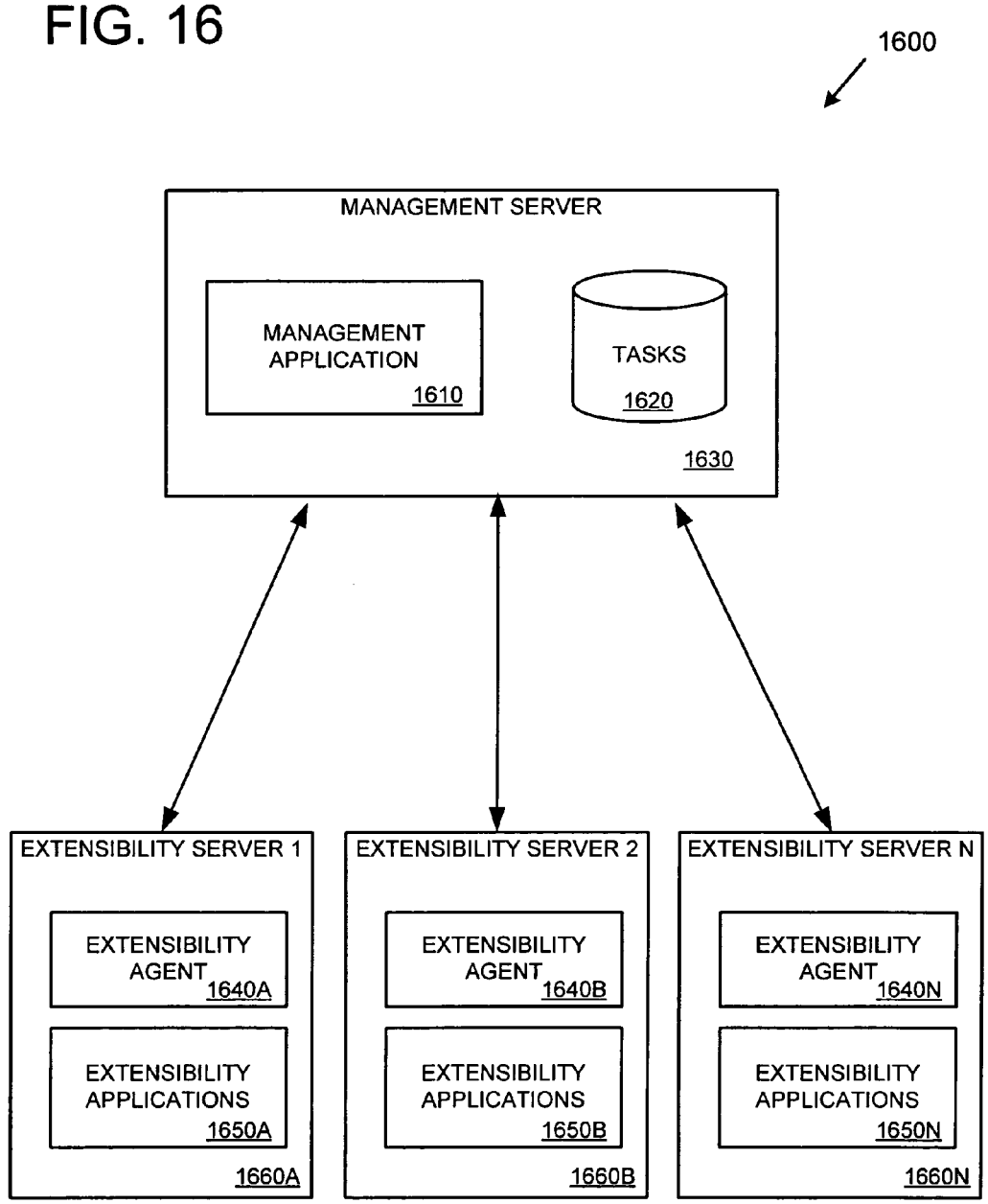
FIG. 16 is a diagram showing an exemplary system for managing extensibility servers and applications.

FIG. 16 shows an exemplary system 1600 for managing extensibility computer servers and extensibility applications on the extensibility computer servers. In the example, a management application 1610 can run on a management computer server 1630. The management application 1610 can be used to manage one or more extensibility computer servers (e.g., extensibility computer servers 1660A-N). The management application 1610 can also be used to manage one or more extensibility applications (e.g., extensibility applications 1650A-N on corresponding extensibility computer servers 1660A-N).

The management application 1610 can manage the extensibility computer servers (1660A-N) and extensibility applications (1650A-N) via extensibility agents (1640A-N) on corresponding extensibility computer servers (1660A-N). In addition, the management application 1610 can manage extensibility applications running on the management server 1630.

The management application 1610 can originate from a different software manufacturer than the extensibility applications 1650A-N (e.g., the extensibility applications can be third party applications). Or, the extensibility applications 1650A-N can originate from the same software manufacturer, but not the same suite of server applications, as the management application 1610.

The management application 1610 can manage extensibility computer servers and extensibility applications using task templates (e.g., using task templates stored in a tasks database 1620). For example, the management application 1610 can display a user interface to a user, and the user can select a user interface element for invoking a task template from the tasks database 1620. As a result of the selection, the management server 1630 can display a user interface of an extensibility application (e.g., 1650A, 1650B, or 1650N) at the management computer server 1630.

Task templates for managing extensibility servers (e.g., 1660A-N) and extensibility applications (e.g., 1650A-N) can be obtained from a remote task update server. The task templates can then be stored in a tasks database 1620.

In addition, the management application 1610 can display status information of the extensibility servers (1660A-N) and extensibility applications (1650A-N). For example, if extensibility computer server 1660A has a problem (e.g., a service has stopped responding or a hardware component has failed), an indication of the problem can be sent, via the extensibility agent 1640A, to the management server 1630 and displayed in a user interface of the management application 1610.

The extensibility computer servers (e.g., 1660A-N) can be backed up. For example, a different computer server (e.g., the management server 1630 or another different computer server) can back up an extensibility computer server (e.g., 1660A, 1660B, or 1660N) via the corresponding extensibility agent (e.g., 1640A, 1640B, or 1640N).

In addition to, or instead of, managing extensibility servers and extensibility applications, the management application 1610 can manage computer servers other than extensibility computer servers and applications other than extensibility applications. For example, FIG. 23 describes such an arrangement.

Example 35

Exemplary Method for Managing an Extensibility Computer Server

Figure 17:
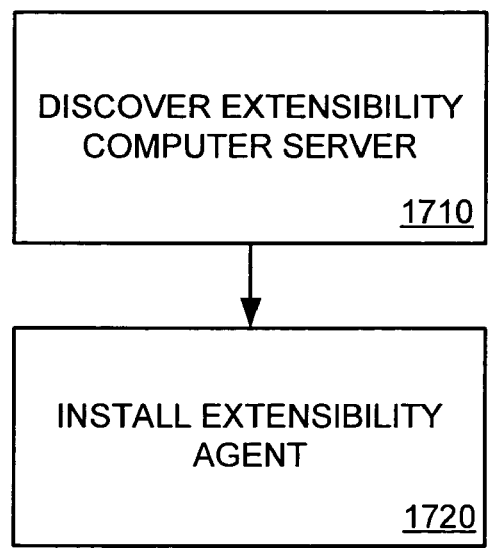
FIG. 17 is a flowchart showing an exemplary method for managing an extensibility computer server.

FIG. 17 shows an exemplary method 1700 for managing an extensibility computer server from a management computer server, and can be performed, for example, by a system such as that shown in FIG. 16. At 1710, the extensibility computer server is discovered. For example, a user using a management application on the management computer server can discover the extensibility computer server (e.g., as a result of selecting an "add extensibility computer server" task template).

At 1720, an extensibility agent is installed on the extensibility computer server. For example, the extensibility agent can be installed from the management computer server. The extensibility agent can provide status information (e.g., information regarding events (e.g., alerts), software update status (e.g., software patch updates), health, and performance) about the extensibility computer server (e.g., provide status information to the management computer server for display by the management application). The extensibility agent can also allow a different computer server to backup the extensibility computer server.

Example 36

Exemplary Method for Managing Extensibility Applications

Figure 18:
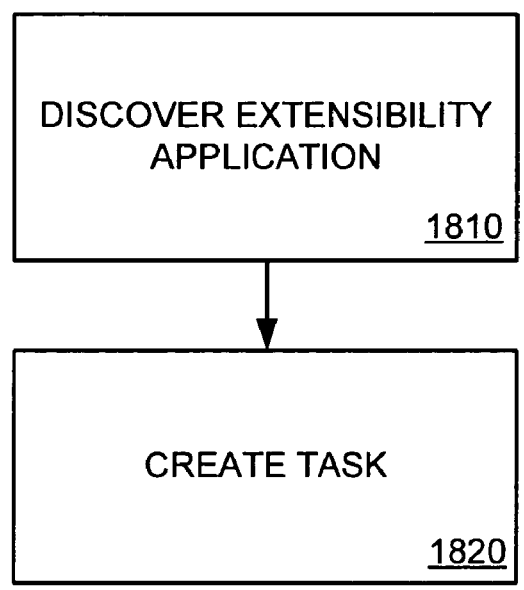
FIG. 18 is a flowchart showing an exemplary method for managing extensibility applications.

FIG. 18 shows an exemplary method 1800 for managing extensibility applications from a management computer server, and can be performed, for example, by a system such as that shown in FIG. 16. At 1810, an extensibility application is discovered. For example, the extensibility application can be discovered by using a management application on the management computer server (e.g., as a result of selecting an "add extensibility application" task from a user interface of the management application). For example, a user of the user interface of the management application can select the "add extensibility application" task, which can result in display of a list of extensibility applications (e.g., via a task template) from which the user can select one or more to manage.

At 1820, a task is created (e.g., on the management computer server) for managing the discovered extensibility application (e.g., the task can be created via a task template). For example, a user of the management application on the management computer server can discover the extensibility application and then navigate to a user interface of the extensibility application. The user can create a task. The task can be created via a task template (e.g., in a format defined by a schema) comprising the location of the user interface of the extensibility application. For example, the location of the user interface can comprise a URL (uniform resource locator), URI (Universal Resource Identifier), or command line identifier, and can be stored, for example, in a location field or location variable of the task template. The created task can then be displayed in a user interface of the management application, and the user can select the task to cause display, at the management computer server, of the user interface of the extensibility application identified by the location. The user interface of the extensibility application can be displayed remotely (e.g., displayed at the management computer server remotely from the extensibility application running on a different computer server). The created task can also be stored (e.g., in a tasks database as a task template in a format defined by a schema).

Multiple tasks can be created to manage a single extensibility application (e.g., by creating multiple task templates corresponding to multiple user interfaces of the extensibility application).

After discovering the extensibility application 1810, a task template can be downloaded (e.g., in a format defined by a schema) from a remote task update server. The downloaded task template can be displayed in a user interface of the management application, and if selected, can cause display of a user interface of the discovered extensibility application at the management computer server.

After discovering the extensibility application 1810, if the discovered extensibility application is located on an extensibility computer server that is not yet managed from the management computer server, an extensibility agent can be installed on the extensibility computer server.

Example 37

Figure 19:
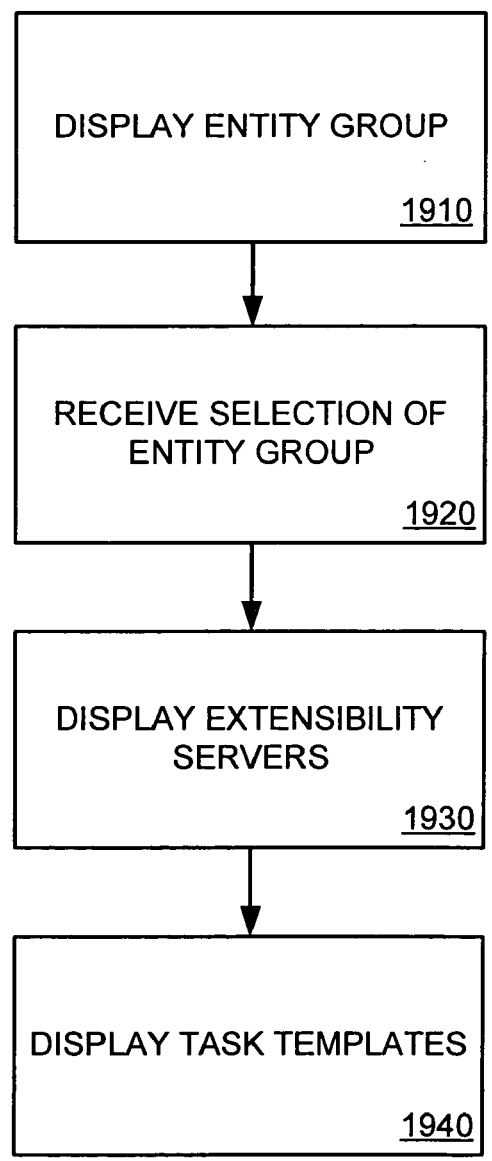
FIG. 19 is a flowchart showing an exemplary method for managing extensibility applications on extensibility computer servers.

Exemplary Method for Managing Extensibility Applications on Extensibility Computer Servers FIG. 19 shows an exemplary method 1900 for managing extensibility applications on extensibility computer servers, and can be performed, for example, by a system such as that shown in FIG. 16. At 1910, an entity group representing one or more extensibility computer servers is displayed in a user interface of a management application on a management computer server. The entity group can be displayed along with other entity groups (e.g., network entity group, users entity group, licensing entity group).

At 1920, a selection of the entity group representing one or more extensibility computer servers is received from a user via the user interface.

At 1930, one or more extensibility computer servers are displayed in the user interface as a result of the selection. The extensibility computer servers can be displayed in a variety of ways (e.g., as a list view or as a topology view).

At 1940, one or more task templates, associated with the selected entity group, are displayed in the user interface as a result of the selection. For example, the task templates can represent contextual tasks.

Task templates associated with one of the extensibility computer servers can also be displayed. For example, a user can select one of the extensibility computer servers from the displayed extensibility computer servers 1930. Based on the selection, one or more task templates associated with the selected extensibility computer server can be displayed (e.g., in a contextual task list).

Various tasks can be accomplished by selecting a displayed task template. For example, if a user selects a task template associated with the selected entity group, it can cause display of status information, at the management server, about the extensibility computer servers comprising the selected entity group (e.g., information regarding events, alerts, software update status, health, or performance). Similarly, if a user selects a task template associated with a specific selected extensibility computer server, it can cause display of status information, at the management server, about the specific selected extensibility computer server.

Example 38

Exemplary Method for Discovering and Managing Extensibility Applications

Figure 20:
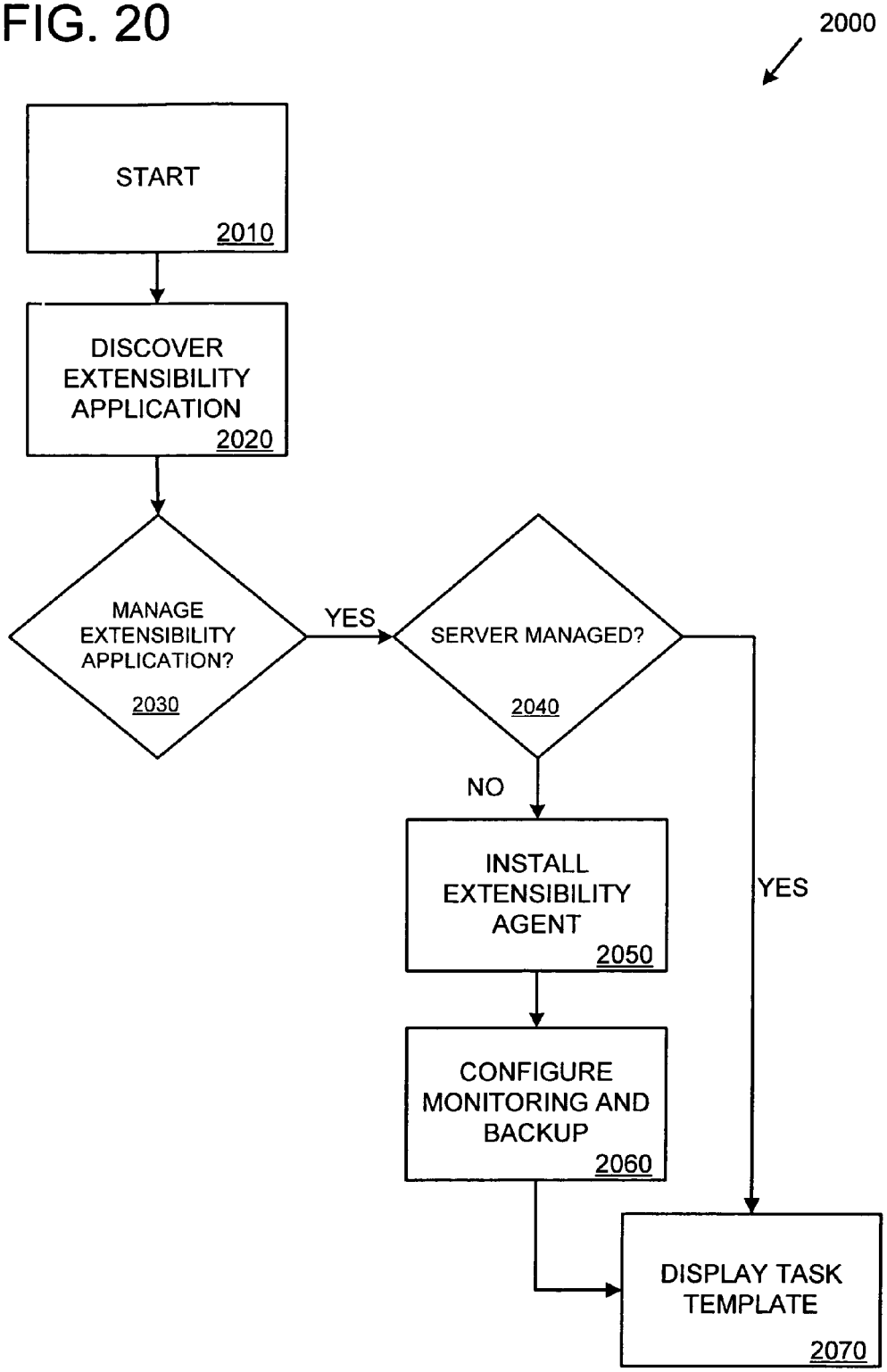
FIG. 20 is a flowchart showing an exemplary method for discovering and managing extensibility applications.

FIG. 20 shows an exemplary method 2000 for discovering and managing extensibility applications, and can be performed, for example, by a system such as that shown in FIG. 16. At 2010, the method starts. At 2020, an extensibility application is discovered (e.g., by a user of a management application on a management computer server). For example, the extensibility application can be presented to the user in a list or topology view of the management application.

At 2030, a decision of whether or not to manage the extensibility application is made. If the decision is not to manage the extensibility application, the method ends. If the decision is to manage the extensibility application, the method proceeds to 2040.

At 2040, a management check is made. The management check comprises determining whether the extensibility application is located on a computer server that is already managed (e.g.; already has an extensibility agent installed or is part of a collection of computer servers managed by a suite of server applications).

At 2050, if the server is not already managed, an extensibility agent is installed on the computer server, and the server is configured for monitoring (e.g., to provide status information to the management application via the extensibility agent) and backups (e.g., to backup to a different server via the extensibility agent) 2060.

At 2070, if the computer server is already managed, or once the extensibility agent has been installed and configured, a task template is displayed in a management application that allows a user to manage the extensibility application.

Example 39

Figure 21:
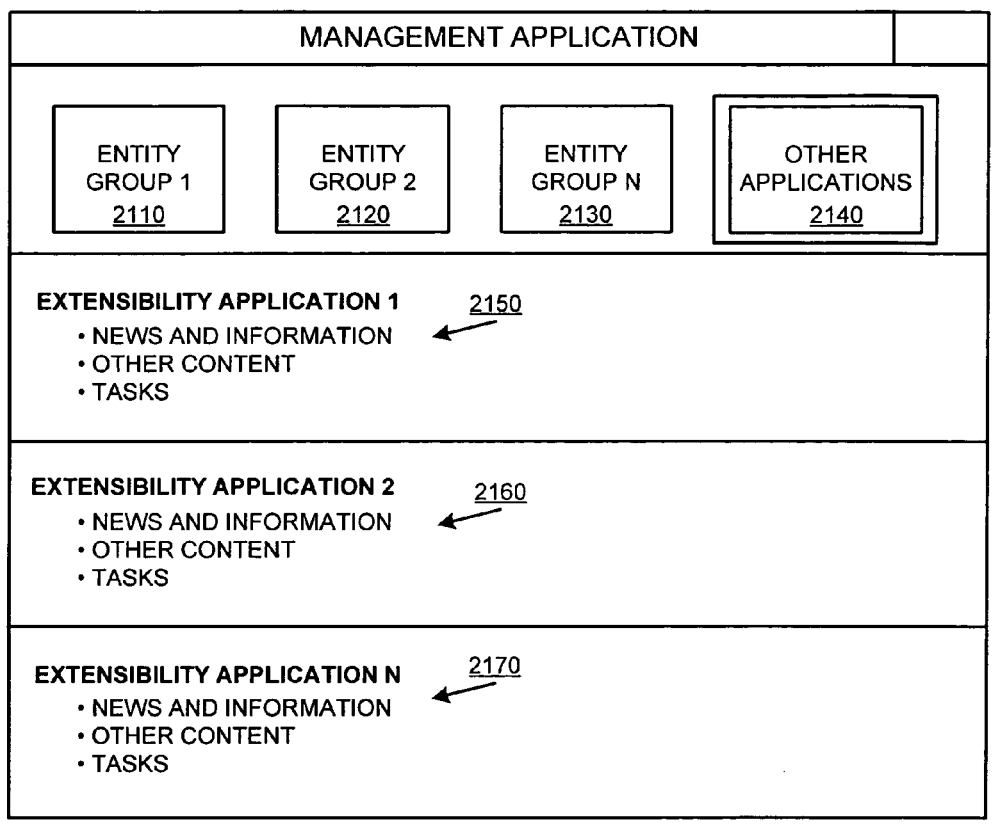
FIG. 21 is a diagram showing an exemplary user interface depicting content related to extensibility applications.

Exemplary User Interface Depicting Content related to Extensibility Applications FIG. 21 shows an exemplary user interface 2100 depicting content related to extensibility applications. The user interface can be displayed, for example, by a system such as that shown in FIG. 16. In the user interface 2100, a number of entity groups are displayed, 2110-2140. In the user interface 2100, the "other applications" entity group 2140 has been selected. The "other applications" entity group 2140 can comprise extensibility servers, extensibility applications, or both.

Based on the selected entity group 2140, content related to the entities (extensibility servers, extensibility applications, or both) comprising the selected entity group 2140 are displayed. Specifically, at 2150 content related to "extensibility application 1" is displayed. Similarly, content related to additional extensibility applications is also displayed at 2160 and 2170.

Various types of content can be displayed. News and information related to the extensibility application or extensibility computer server can be displayed. For example, if an extensibility application originates from a software manufacturer, the software manufacturer can provide news and other information to be displayed in the user interface (e.g., at 2150). The news and other information can be downloaded from the software manufacturer, for example, via the Internet (e.g., via an RSS feed). Task templates can also be displayed (e.g., task templates for accomplishing tasks). For example, the task templates can be downloaded from the software manufacturer, or from a remote task update server, and can be used to manage extensibility applications and extensibility computer servers. Other types of information can also be displayed (e.g., press releases from the software manufacturer, help information such as additional documentation, tips, frequently asked questions (FAQs), and links to help resources such as online help resources).

Example 40

Exemplary Management Application User Interface

Figure 22:
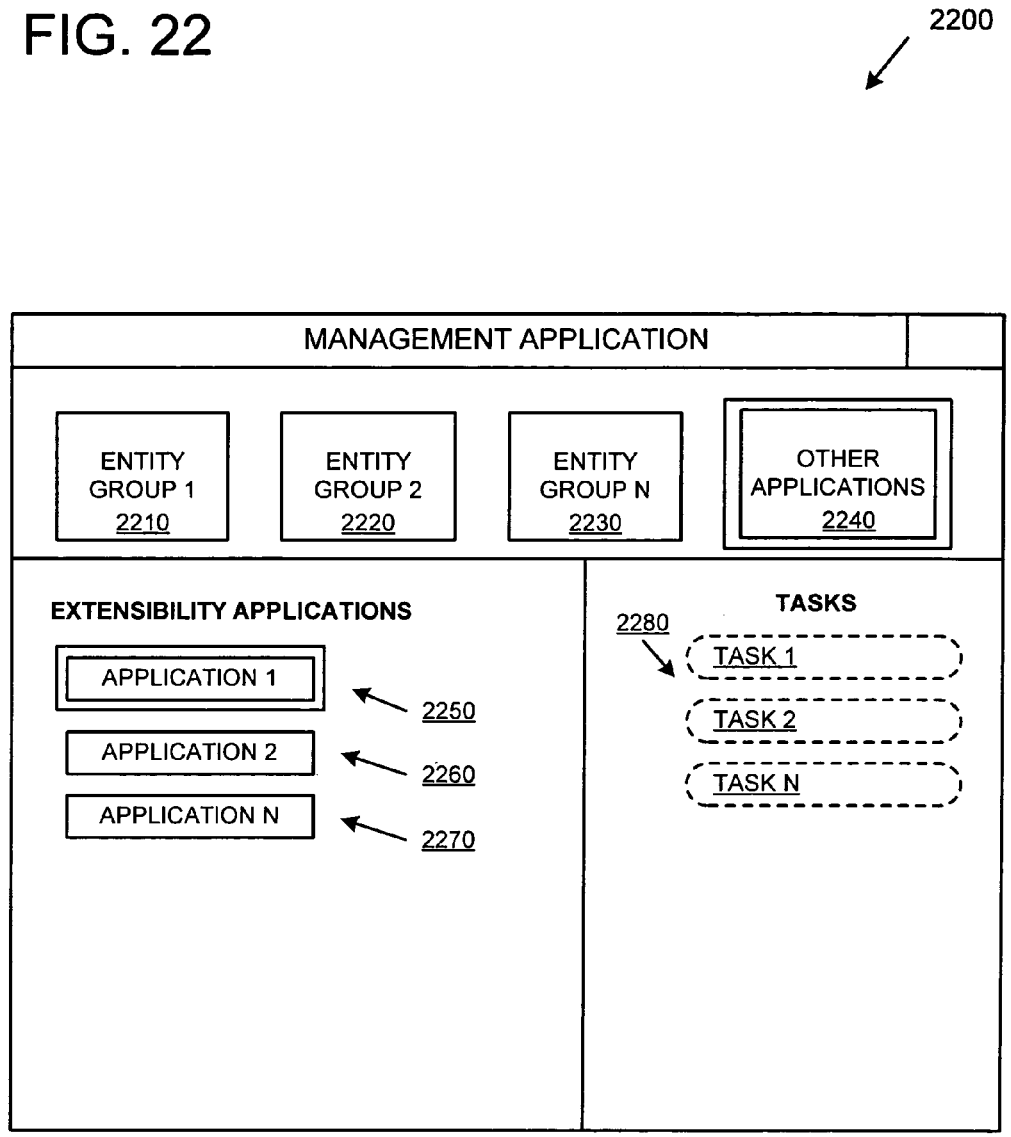
FIG. 22 is a diagram showing an exemplary user interface of a management application depicting extensibility applications.

FIG. 22 shows an exemplary user interface 2200 depicting extensibility applications. The user interface can be displayed, for example, by a system such as that shown in FIG. 16. In the user interface 2200, a number of entity groups are displayed, 2210-2240. In the user interface 2200, the "other applications" entity group 2240 has been selected. The "other applications" entity group 2240 can comprise extensibility servers, extensibility applications, or both.

Based on the selected entity group 2240, a number of extensibility applications are displayed 2250-2270. One of the extensibility applications has been selected 2250. Based on the selected extensibility application 2250, a number of task templates related to the selected extensibility application are displayed 2280. The task templates can be used to accomplish tasks related to the selected extensibility application 2250 (e.g., to display a user interface of the selected extensibility application). For example, the tasks 2280 can be a contextual task list.

Extensibility computer server entities can also be displayed based on the selection of the entity group 2240. If an extensibility computer server entity is selected, then task templates related to the selected extensibility computer server can be displayed (e.g., task templates selectable to cause display of events, alerts, health, or performance of the extensibility computer server).

Example 41

Exemplary Server Applications

In any of the examples herein, server applications can be any software installed on a server. For example, server applications can include any server application offering a service for use by a client. In practice, such server applications can include file sharing services, email servers, licensing services, directory services, firewall services, anti-spam services, anti-virus detection services, networking services (e.g., services for managing identities and relationships that make up a network), and the like.

Server applications can also include operating system programs, such as an operating system, operating system enhancements, or both.

Example 42

Exemplary Multi-Server System for Performing Tasks

Figure 23:
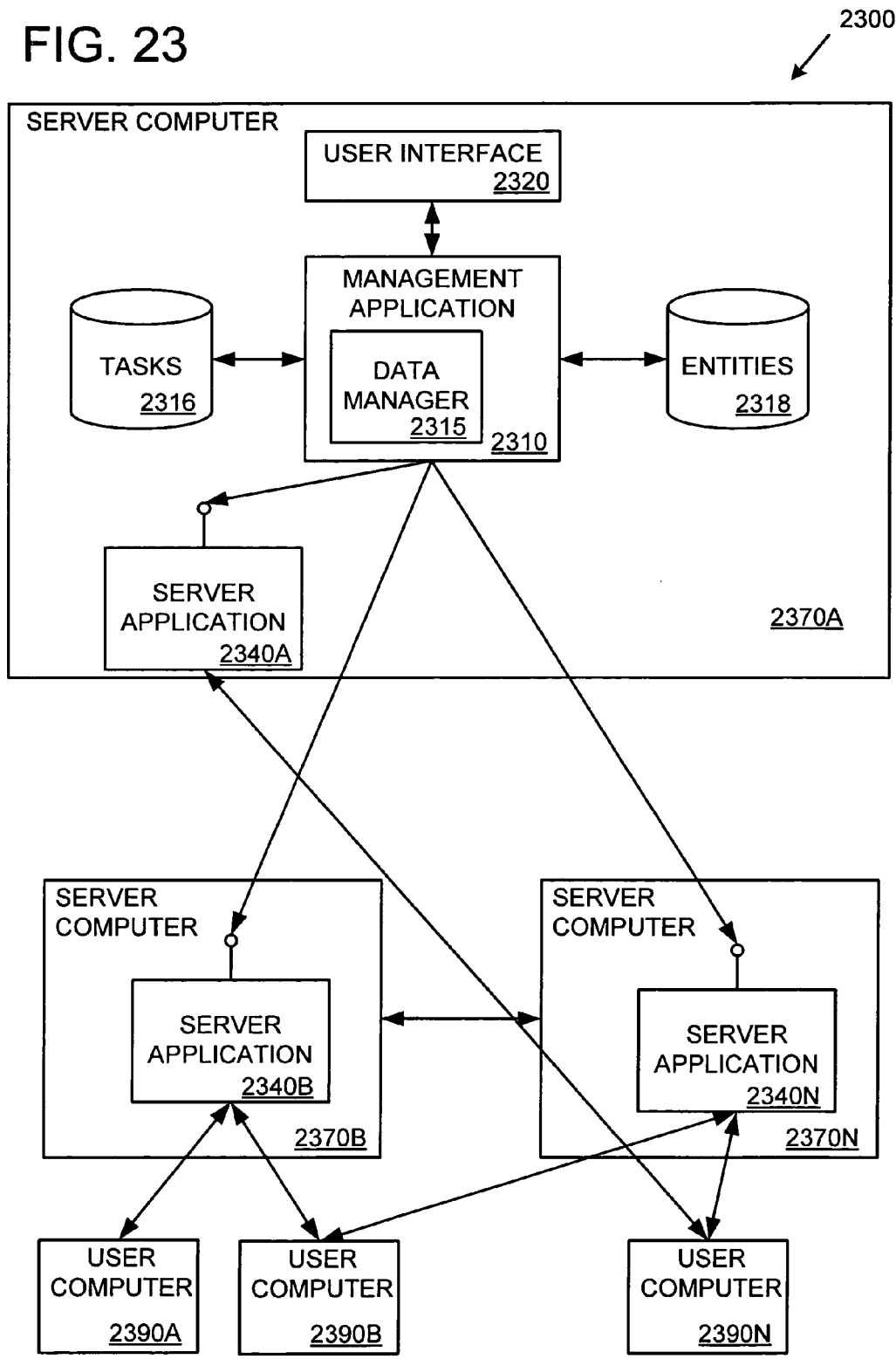
FIG. 23 is a diagram showing an exemplary multi-server system for performing tasks.

FIG. 23 shows an exemplary multi-server system 2300 for performing tasks. In the example, a management application 2310 (e.g., a server application) can run on a computer server 2370A. For example, the management application can comprise a data manager 2315 for managing a number of computer servers by managing server applications on the computer servers (e.g., server application 2340A on server 2370A, server application 2340B on server 2370B, and server application 2340N on server 2370N).

The server applications (2340A-2340N) can include, for example, server applications for providing computer services to a business or organization, such as: email applications, file serving applications, remote access applications, user management applications, licensing applications, anti-virus applications, and monitoring applications. Different servers of the multi-server system can perform specific services for a business or organization by running different server applications. For example, the multi-server system can comprise three servers: a management server (e.g., 2370A) running a file service application (e.g., 2340A), an email server (e.g., 2370B) running an email application (e.g., 2340B), and a firewall server (e.g., 2370N) running an anti-virus application (e.g., 2340N).

The data manager 2315 can manage a server application (e.g., 2340A, 2340B, or 2340N) on a server (e.g., 2370A, 2370B, or 2370N) by communicating with an API of the server application. For example, a user management server application can provide an API for displaying various user interfaces within the user management application (e.g., a user interface for adding users, a user interface for deleting users, and a user interface for resetting a user's password).

The management application 2310 can provide a user interface 2320 allowing a user to manage the servers and applications of the multi-server system 2300 using tasks 2316. For example, the user interface 2320 of the management application 2310 can display tasks 2316 (e.g., displayed as user interface elements for initiating the tasks) in a variety of forms, such as a context-free task list or a contextual task list. The user interface 2320 can also display entities and entity groups (e.g., from an entities database 2318). For example, a user can select an entity or entity group from the user interface 2320 to display contextual tasks.

The tasks 2316 can be stored (e.g., as task templates) in a database. The task templates can be used to accomplish (e.g., complete) a task by directing a user to a user interface for accomplishing the task. For example, a task template can comprise a location variable, where the location variable represents a user interface of a server application by way of an API of the server application.

For example, the management application 2310 can display, in the user interface 2320, an entity from the entities database 2318, receive a selection of the entity from a user, display a task from the tasks database 2316, and receive a selection of the task from the user. The management application 2310 can then, via the data manager 2315, using a location variable from a task template associated with the selected task, connect to an API of a server application (e.g., 2340A, 2340B, or 2340N) and display a user interface which the user can then use to complete the selected task.

Server applications (e.g., 2340A-N) can also provide services (e.g., email services, file sharing services, user services) to user computers (e.g., 2390A-N).

Example 43

Exemplary Computing Environment

Figure 24:
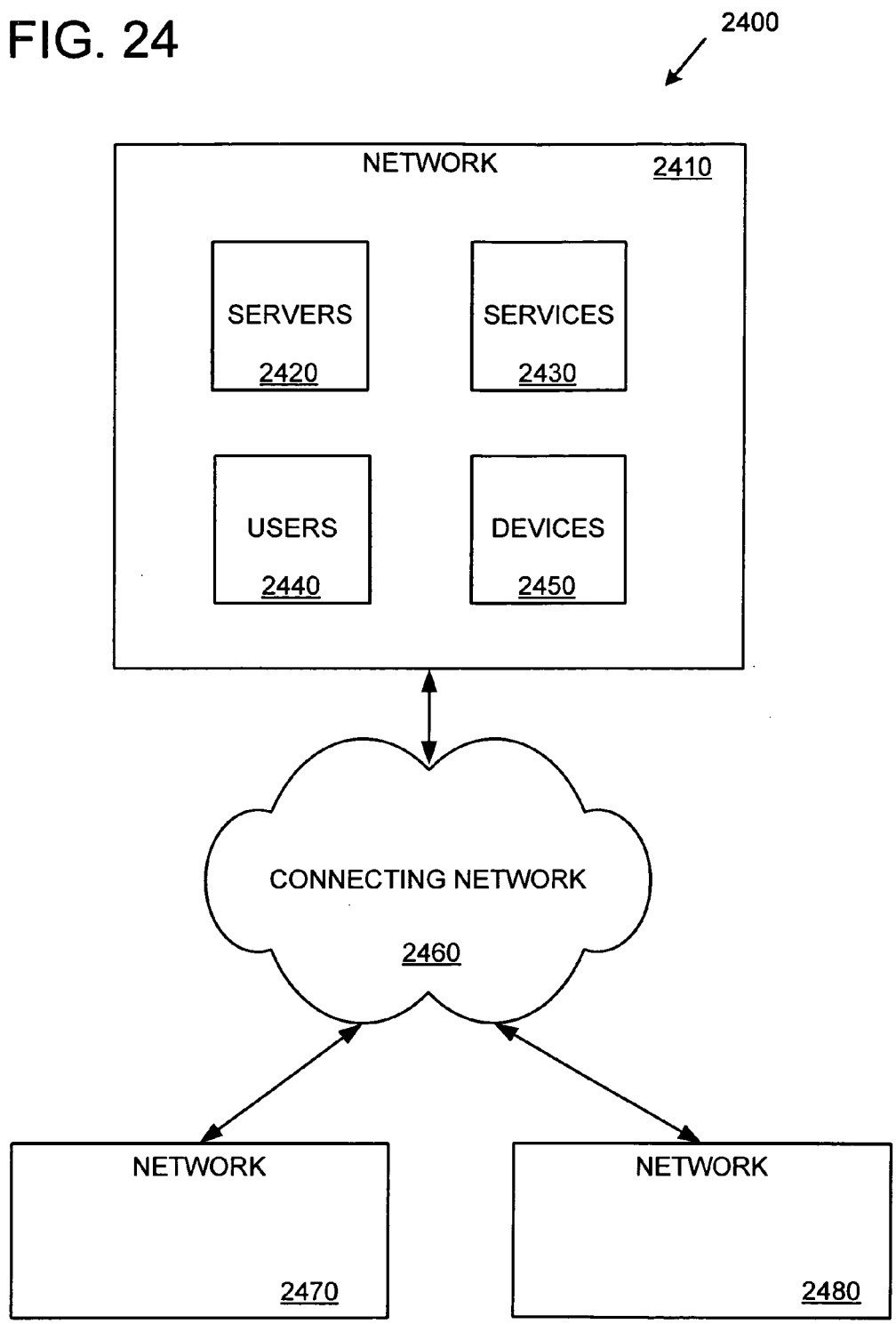
FIG. 24 is a block diagram illustrating an example of a computing environment that can be used to implement any of the technologies described herein.

FIG. 24 illustrates an example computing environment 2400 that can be used to implement any of the technologies described herein. The computing environment includes a network 2410. The network 2410 can comprise servers 2420 (e.g., computer servers), services 2430 (e.g., computer services), users 2440 (e.g., general computer users, IT administrators, employees), and devices 2450 (e.g., desktop or laptop computers, printers, copiers, scanners).

The network 2410 can connect to other networks, such as 2470 and 2480 through in connecting network 2460. For example, the connecting network 2460 can comprise a wide area network such as the Internet or a local network. The connecting network can comprise various network hardware, protocols, and topologies.

Example 44

Exemplary General Purpose Computer System

Figure 25:
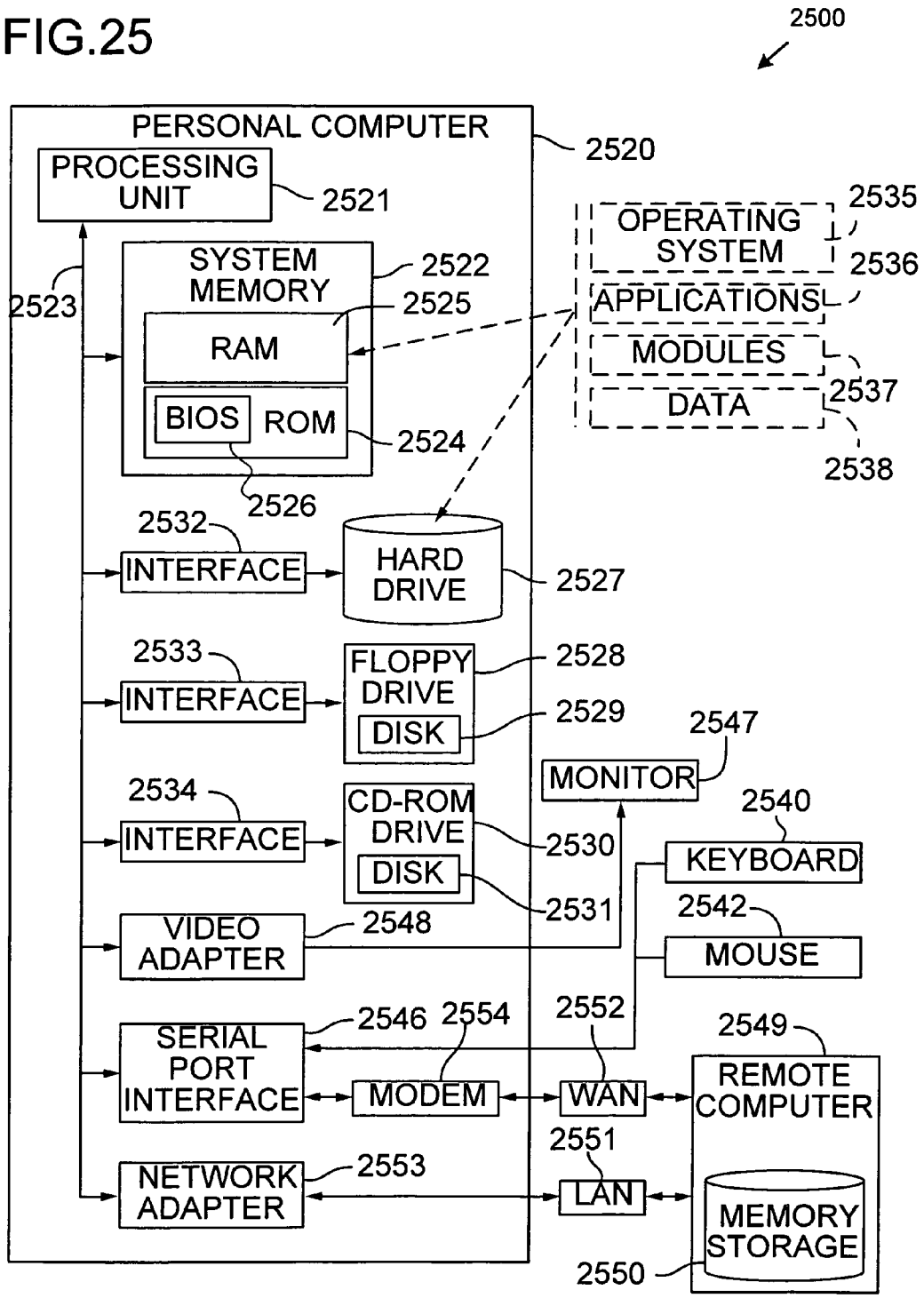
FIG. 25 is a block diagram illustrating an example of a computer system that can be used to implement any of the technologies described herein.

FIG. 25 illustrates an example of a computer system 2500 that can be used to implement any of the technologies described herein. The computer system includes a personal computer 2520, including a processing unit 2521, a system memory 2522, and a system bus 2523 that interconnects various system components including the system memory to the processing unit 2521. The system bus may comprise any of several types of bus structures including a memory bus or memory controller, a peripheral bus, and a local bus using a bus architecture such as PCI, VESA, Microchannel (MCA), ISA and EISA, to name a few. The system memory includes read only memory (ROM) 2524 and random access memory (RAM) 2525. A basic input/output system 2526 (BIOS), containing the basic routines that help to transfer information between elements within the personal computer 2520, such as during start-up, is stored in ROM 2524. The personal computer 2520 further includes a hard disk drive 2527, a magnetic disk drive 2528 (e.g., to read from or write to a removable disk 2529), and an optical disk drive 2530 (e.g., for reading a CD-ROM disk 2531 or to read from or write to other optical media). The hard disk drive 2527, magnetic disk drive 2528, and optical disk drive 2530 are connected to the system bus 2523 by a hard disk drive interface 2532, a magnetic disk drive interface 2533, and an optical drive interface 2534, respectively. The drives and their associated computer-readable media provide nonvolatile storage of data, data structures, computer-executable instructions (program code such as dynamic link libraries, and executable files), etc. for the personal computer 2520. Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 2525, including an operating system 2535, one or more application programs 2536, other program modules 2537, and program data 2538. A user may enter commands and information into the personal computer 2520 through a keyboard 2540 and pointing device, such as a mouse 2542. Other input devices (not shown) may include a microphone, joystick, game pad, satellite dish, scanner, or the like. These and other input devices are often connected to the processing unit 2521 through a serial port interface 2546 that is coupled to the system bus, but may be connected by other interfaces, such as a parallel port, game port or a universal serial bus (USB). A monitor 2547 or other type of display device is also connected to the system bus 2523 via an interface, such as a display controller or video adapter 2548. In addition to the monitor, personal computers typically include other peripheral output devices (not shown), such as speakers and printers.

The personal computer 2520 may operate in a networked environment using logical connections to one or more remote computers, such as a remote computer 2549. The remote computer 2549 may be a server, a router, a peer device or other common network node, and typically includes many or all of the elements described relative to the personal computer 2520, although only a memory storage device 2550 has been illustrated in FIG. 25. The logical connections depicted in FIG. 25 include a local area network (LAN) 2551 and a wide area network (WAN) 2552. Such networking environments are commonplace in offices, enterprise-wide computer networks, intranets and the Internet.

When used in a LAN networking environment, the personal computer 2520 is connected to the local network 2551 through a network interface or adapter 2553. When used in a WAN networking environment, the personal computer 2520 typically includes a modem 2554 or other means for establishing communications over the wide area network 2552, such as the Internet. The modem 2554, which may be internal or external, is connected to the system bus 2523 via the serial port interface 2546. In a networked environment, program modules depicted relative to the personal computer 2520, or portions thereof, may be stored in the remote memory storage device. The network connections shown are merely examples and other means of establishing a communications link between the computers may be used.

Example 45

Exemplary Automated Methods

Any of the methods described herein can be performed via one or more computer-readable media having computer-executable instructions for performing such methods. Operation can be fully automatic, semi-automatic, or involve manual intervention.

Example 46

Exemplary Combinations

The technologies of any example described herein can be combined with the technologies of any one or more other examples described herein.

Example 47

Exemplary Alternatives

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer implemented method for managing applications or services from a management computer server, the method comprising:
    discovering an extensibility application, located on an extensibility computer server, by using a management application on the management computer server;
    creating a task, on the management computer server, for managing the discovered extensibility application, wherein the task is created via a task template, wherein the task template is in a format defined by a schema, wherein the task template comprises a location variable, and wherein the location variable identifies a graphical user interface window of the extensibility application;
    displaying, in a user interface of the management application, a user interface element for invoking the task;
    receiving, from a user of the user interface of the management application, a selection of the user interface element for invoking the task;
    as a result of the selection, displaying, at the management computer server, the graphical user interface window of the extensibility application identified by the location variable of the task template, wherein the graphical user interface window of the extensibility application is displayed remotely at the management computer server from the extensibility application running on the extensibility computer server;
    tracking, by the management computer server, a pattern of task usage by the user;
    associating, by the management computer server, a software manufacturer profile with the user, wherein the software manufacturer profile, selected from a plurality of software manufacturer profiles, is associated with the user based on the tracked pattern of task usage;
    downloading a task template from a remote task update server, wherein the downloaded task template is recommended by the remote task update server based on the software manufacturer profile associated with the user, wherein the downloaded task template is operable to cause display of a second graphical user interface window of the extensibility application remotely at the management computer server, and wherein the downloaded task template is downloaded in the format defined by the schema; and
    installing an extensibility agent on an extensibility computer server from the management computer server, wherein the extensibility agent is configured to provide status information about the extensibility computer server, wherein the status information comprises software patch update information, health information, and performance information for the extensibility computer server, wherein the extensibility agent is also configured to allow a different computer server to backup one or more computer storage devices of the extensibility computer server, and wherein the extensibility application is located on the extensibility computer server.

2. The method of claim 1 further comprising:
    before discovering the extensibility application, displaying, in a user interface of the management application, a user interface element for discovering extensibility applications; and
    receiving a selection, by a user via the user interface, of the user interface element for discovering extensibility applications.

3. The method of claim 1 wherein the management computer server is one of a plurality of integrated computer servers, and wherein the extensibility computer server is a different computer server from the plurality of integrated computer servers.

4. The method of claim 1 wherein the management application originates from a software manufacturer, and wherein the extensibility application originates from a different software manufacturer.

5. The method of claim 1 wherein the management application is one of a plurality of applications comprising an integrated suite of server applications, and wherein the extensibility application is one of a plurality of server applications different from the plurality of applications comprising the integrated suite of server applications.

6. The method of claim 1 further comprising:
    receiving, from the user of the user interface of the management application, a selection of a business category of a business operating the management computer server; and
    receiving, from the user of the user interface of the management application, a selection of one or more characteristics of the business;
    wherein the software manufacturer profile is selected and associated with the user based, at least in part, on the selection of the business category and the selection of the one or more characteristics of the business.

7. A computer implemented method for managing an extensibility computer server from a management computer server, the method comprising:
    discovering the extensibility computer server by using a management application on the management computer server;
    installing an extensibility agent on the extensibility computer server from the management computer server, wherein the extensibility agent is configured to provide status information about the extensibility computer server, wherein the extensibility agent is also configured to allow a different computer server to backup the extensibility computer server;
    backing up one or more computer storage devices of the extensibility computer server via the extensibility agent on the extensibility computer server;
    receiving, by the management computer server from the extensibility computer server via the extensibility agent, status information about the extensibility computer server, wherein the status information comprises information regarding software updates;
    displaying, in a user interface of the management application, a user interface element for invoking a task template, wherein the task template is selectable, via the user interface element, to cause display of a graphical user interface window of an extensibility application located on the extensibility computer server, wherein the graphical user interface window of the extensibility application is remotely displayed at the management computer server from the extensibility application running on the extensibility computer server, wherein the task template comprises a location variable, and wherein the location variable identifies the graphical user interface window of the extensibility application;

tracking, by the management computer server, a pattern of task usage by a user of the management application;

associating, by the management computer server, a software manufacturer profile with the user, wherein the software manufacturer profile, selected from a plurality of software manufacturer profiles, is associated with the user based on the tracked pattern of task usage; and downloading a task template from a remote task update server, wherein the downloaded task template is recommended by the remote task update server based on the software manufacturer profile associated with the user, wherein the downloaded task template is operable to cause display of a second graphical user interface window of the extensibility application remotely at the management computer server, and wherein the downloaded task template is downloaded in a format defined by a schema.

8. The method of claim 7 further comprising:

displaying, in a user interface of the management application, a user interface element representing extensibility applications;

receiving, via the user interface, a selection of the user interface element representing the extensibility applications; and displaying, in the user interface, help information related to the extensibility applications.

9. The method of claim 7 wherein the management application originates from a first software manufacturer, and the extensibility application originates from a different second software manufacturer.

10. A computer implemented method for managing extensibility applications on extensibility computer servers from a management computer server, the method comprising:

displaying, in a user interface of a management application on the management computer server, an entity group representing a plurality of extensibility computer servers;

receiving, from a user via the user interface, a selection of the entity group representing the plurality of extensibility computer servers;

responsive to receiving the selection of the entity group, displaying, in the user interface, the plurality of extensibility computer servers;

responsive to receiving the selection of the entity group, displaying, in the user interface, a plurality of task templates associated with the selected plurality of extensibility computer servers;

receiving, from the user via the user interface, a selection of an extensibility computer server from the displayed plurality of extensibility computer servers and a selection of a task template, associated with the selected extensibility computer server, from the displayed plurality of task templates, wherein the task template comprises a location variable, and wherein the location variable identifies a graphical user interface window of an extensibility application running on the extensibility computer server;

as a result of the selection of the task template, displaying, at the management computer server, the graphical user interface window of the extensibility application identified by the location variable of the task template, wherein the graphical user interface window of the extensibility application is displayed remotely at the management computer server from the extensibility application running on the extensibility computer server;

tracking, by the management computer server, a pattern of task usage by the user;

associating, by the management computer server, a software manufacturer profile with the user, wherein the software manufacturer profile, selected from a plurality of software manufacturer profiles, is associated with the user based on the tracked pattern of task usage;

downloading a task template from a remote task update server, wherein the downloaded task template is recommended by the remote task update server based on the software manufacturer profile associated with the user, wherein the downloaded task template is operable to cause display of a second graphical user interface window of the extensibility application remotely at the management computer server, and wherein the downloaded task template is downloaded in a format defined by a schema; and installing an extensibility agent on the extensibility computer server from the management computer server, wherein the extensibility agent is configured to provide status information about the extensibility computer server, wherein the extensibility agent is also configured to allow a different computer server to backup one or more computer storage devices of the extensibility computer server.

11. The method of claim 10 further comprising:

receiving, from the user via the user interface, a selection of a second task template from the plurality of task templates associated with the plurality of extensibility computer servers comprising the selected entity group;

as a result of the selection of the second task template, displaying, in the user interface of the management application, status information of one or more of the plurality of extensibility computer servers.

* * * * *